(12) United States Patent
Trui et al.

(10) Patent No.: US 9,579,786 B2
(45) Date of Patent: Feb. 28, 2017

(54) SPHERICAL COORDINATES MANIPULATING MECHANISM

(71) Applicant: Wen-Der Trui, Taichung (TW)

(72) Inventors: Wen-Der Trui, Taichung (TW); Shu-Ching Lin, Taichung (TW)

(*) Notice: Subject to any disclaimer, the term of this patent is extended or adjusted under 35 U.S.C. 154(b) by 91 days.

(21) Appl. No.: 14/493,414

(22) Filed: Sep. 23, 2014

(65) Prior Publication Data
US 2015/0082934 A1 Mar. 26, 2015

(30) Foreign Application Priority Data

Sep. 26, 2013 (TW) ............................... 102134887 A
May 15, 2014 (TW) ............................... 103117062 A

(51) Int. Cl.
| B25J 18/04 | (2006.01) |
| B25J 9/00 | (2006.01) |
| F16M 11/12 | (2006.01) |
| F16M 11/18 | (2006.01) |

(52) U.S. Cl.
CPC .......... B25J 9/0048 (2013.01); F16M 11/123 (2013.01); F16M 11/18 (2013.01); Y10S 901/15 (2013.01); Y10T 74/20305 (2015.01)

(58) Field of Classification Search
CPC ........ A63G 31/00; A63B 19/04; A63B 22/18; B25J 18/04; B25J 18/005; B25J 9/0036; B25J 9/0039; B25J 9/0048; B25J 9/0057; B25J 9/006; B25J 9/0066; B25J 9/0069; F16M 11/123; F16M 11/18; F16M 11/205; G09B 9/12; Y10T 74/20305; Y10S 901/15; Y10S 901/18

USPC ..... 74/490.01; 434/55, 59; 464/106; 472/47, 472/57, 59, 130; 901/18
See application file for complete search history.

(56) References Cited

U.S. PATENT DOCUMENTS

| 5,556,242 | A | * | 9/1996 | Sheldon | B23Q 1/5462 408/234 |
| 5,656,905 | A | * | 8/1997 | Tsai | B23Q 1/5462 318/560 |
| 5,966,991 | A | | 10/1999 | Gosselin et al. | |
| 6,026,703 | A | * | 2/2000 | Stanisic | B25J 17/0266 464/106 |
| 6,059,703 | A | * | 5/2000 | Heisel | B23Q 1/5462 248/631 |
| 6,105,455 | A | * | 8/2000 | Rosheim | B25J 17/0266 74/490.03 |
| 6,331,152 | B1 | * | 12/2001 | Holle | A47C 3/02 434/55 |
| 8,579,714 | B2 | | 11/2013 | Trui et al. | |
| 9,348,197 | B2 | * | 5/2016 | Lewis | G03B 17/561 248/550 |
| 9,352,468 | B2 | * | 5/2016 | Ehrenleitner | B25J 11/00 248/122.1 |

(Continued)

Primary Examiner — David M Fenstermacher
Assistant Examiner — Leonard J Archuleta

(57) ABSTRACT

A spherical coordinates manipulating mechanism for improving the utility of U.S. Pat. No. 8,579,714 B2 is provided. Four inner and outer arc-links are pivotally connected to the inner and outer frame respectively so as to carry out a three degrees-of-freedom steering motion. At least one effector arc-link set is selectively connected to the inner or outer frame so that the spherical coordinates manipulating mechanism can directly output force or torque.

5 Claims, 25 Drawing Sheets

(56) References Cited

U.S. PATENT DOCUMENTS

| | | | |
|---|---|---|---|
| 2011/0207106 A1* | 8/2011 | Pacheco | G09B 23/10 434/300 |
| 2013/0209967 A1* | 8/2013 | Guehring | G09B 9/04 434/33 |
| 2015/0323414 A1* | 11/2015 | In | G09B 9/04 73/11.07 |
| 2015/0356878 A1* | 12/2015 | Warmerdam | G09B 9/00 73/865.6 |

* cited by examiner

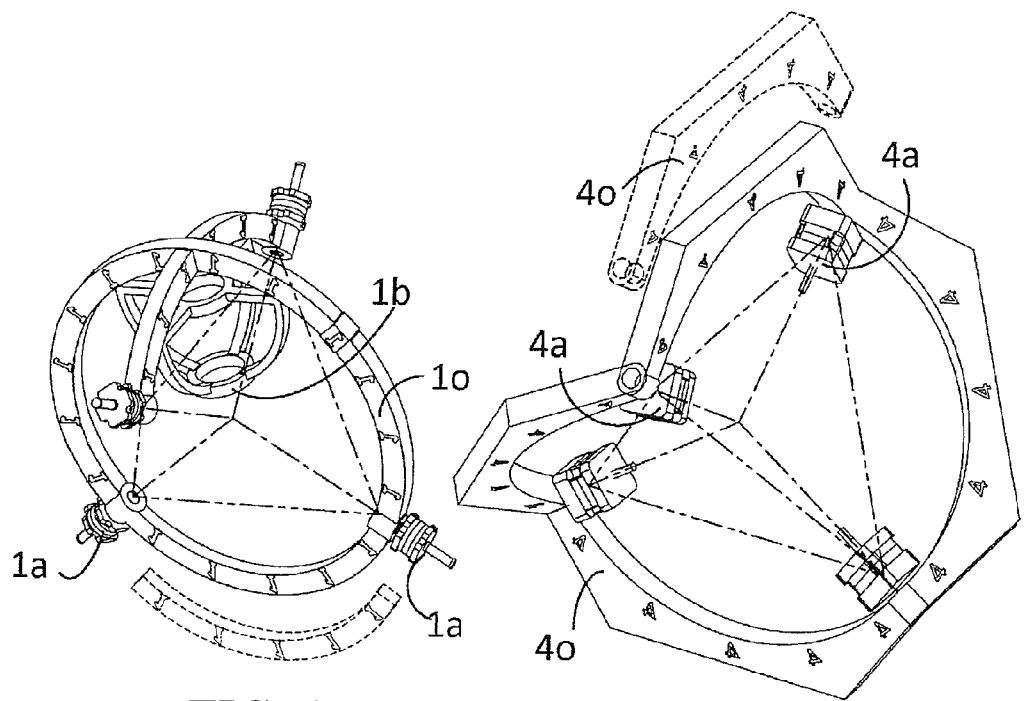
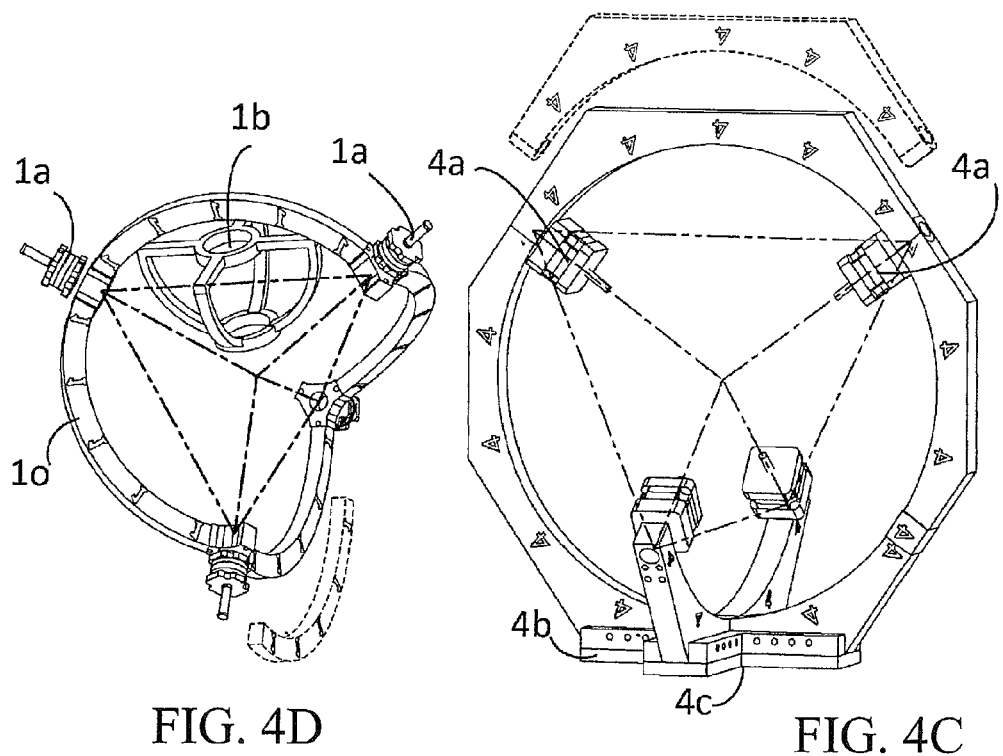

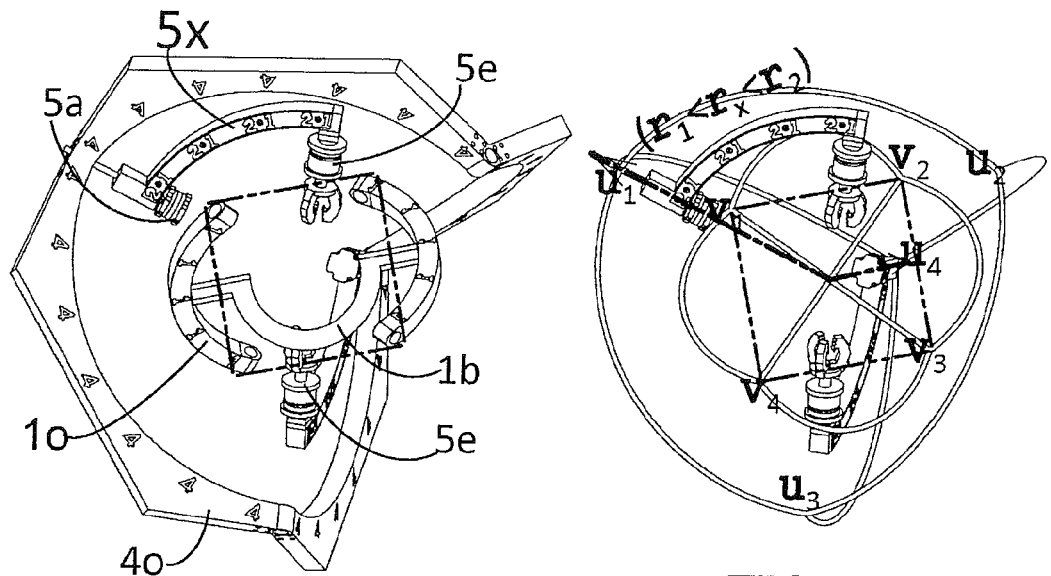
FIG. 9A
FIG. 9B
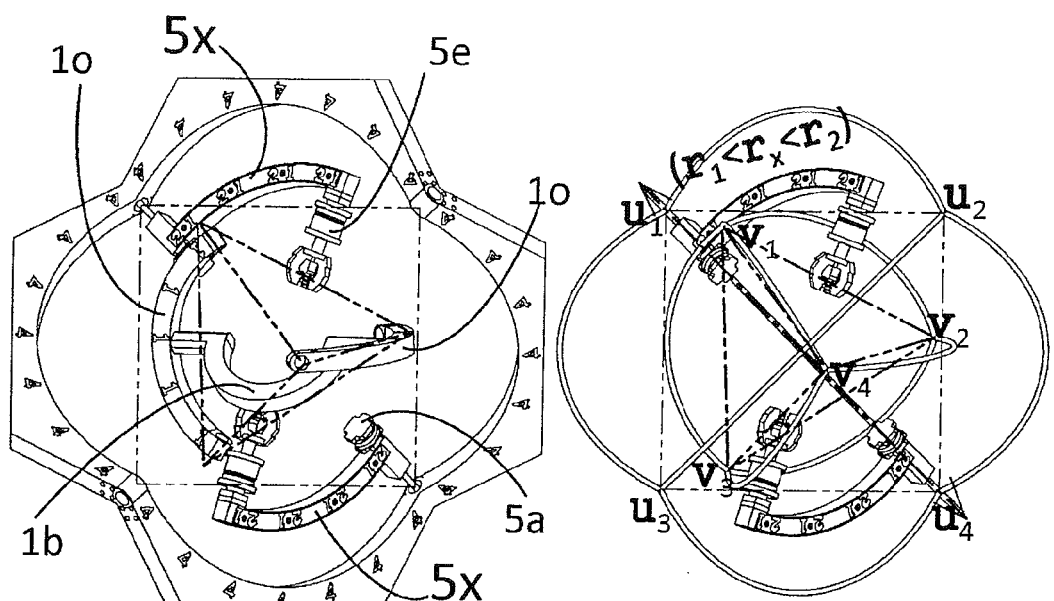
FIG. 9C
FIG. 9D

SPHERICAL COORDINATES MANIPULATING MECHANISM

BACKGROUND OF THE INVENTION

1. Field of the Invention

The invention relates to robot arms or motion platforms and more particularly to a spherical coordinates manipulating mechanism capable of maneuvering payloads by carrying out multiple degrees-of-freedom.

2. Description of Related Art

Conventionally, gimbals type multi-ring mechanisms are used in devices involving spherical coordinates motion. Its multiple rings permit the payload it carries to rotate continuously in large angles. The mechanism having less payload capacity and inefficient inertia would have limited applications. However, it is constructed by connecting arc-links sequentially. In order to meet the output requirement, each ring must have a significantly increased diameter to contain the corresponding actuator assemblies, resulting in the overall mechanism to be excessively large and out of proportion with the payload capacity. The presence of actuator assemblies mounted to moving parts of the orientating mechanism may cause bulkiness and complexity of the mechanism. In addition, difficulty in electric connections may exist between the actuator assemblies coupled to the rings, and the inter-twisted wires may also hinder the operation of the mechanism.

In 1990, a 3-RRR spherical parallel mechanism named Agile Eye was invented by professors C. M. Gosselin and J. F. Hamel of University Lavel. When viewing the Agile Eye from above, there can be seen three concentric axes on the mechanism formed at 120° relative to one another. The mechanism consists of three rotating inputs, which actuate a series of spherical linkages to orient a payload. The Agile Eye takes advantage of parallel mechanism and can orient in three degrees-of-freedom. Another configuration, a two degrees-of-freedom version (U.S. Pat. No. 5,966,991) was also invented by Professor C. M. Gosselin. This orientating device employs a spherical five-bar linkage mechanism.

SUMMARY OF THE INVENTION

U.S. Pat. No. 8,579,714 B2 aims at eliminating drawbacks of the conventional gimbals type mechanism and is characterized below. There are two concentric tetrahedron structures and four sets of inner arc-link and outer arc-link so as to construct an orientating mechanism of three degrees-of-freedom. The invention is an improvement of U.S. Pat. No. 8,579,714 B2 by installing at least one effector arc-link set selectively connected to an outer frame or an inner frame so as to construct a spherical coordinates manipulating mechanism of multiple degrees-of-freedom for directly outputting force or torque. While U.S. Pat. No. 8,579,714 B2 has a greater space for manipulation due to no hinder of the effector arc-link set, the invention is capable of directly outputting force or torque due to the provision of at least one effector arc-link set.

The above and other objects, features and advantages of the invention will become apparent from the following detailed description taken with the accompanying drawings.

BRIEF DESCRIPTION OF THE DRAWINGS

FIG. 4A is a perspective view of outer frame rotating member inboard mounting;

FIG. 4B is a perspective view of inner frame rotating member outboard mounting;

FIG. 4C is a perspective view of another shape of inboard mounting of FIG. 4A;

FIG. 4D is a perspective view of another shape of outboard mounting of FIG. 4B;

FIG. 9A is a perspective view of two effector arc-link sets pivotally connected to the outer frame with yoke type inner frame;

FIG. 9B shows a geometric definition of FIG. 9A;

FIG. 9C is another perspective view of two effector arc-link sets pivotally connected to the outer frame with yoke type inner frame of FIG. 9A;

FIG. 9D shows a geometric definition of FIG. 9C;

DETAILED DESCRIPTION OF THE INVENTION

Figure 1A:
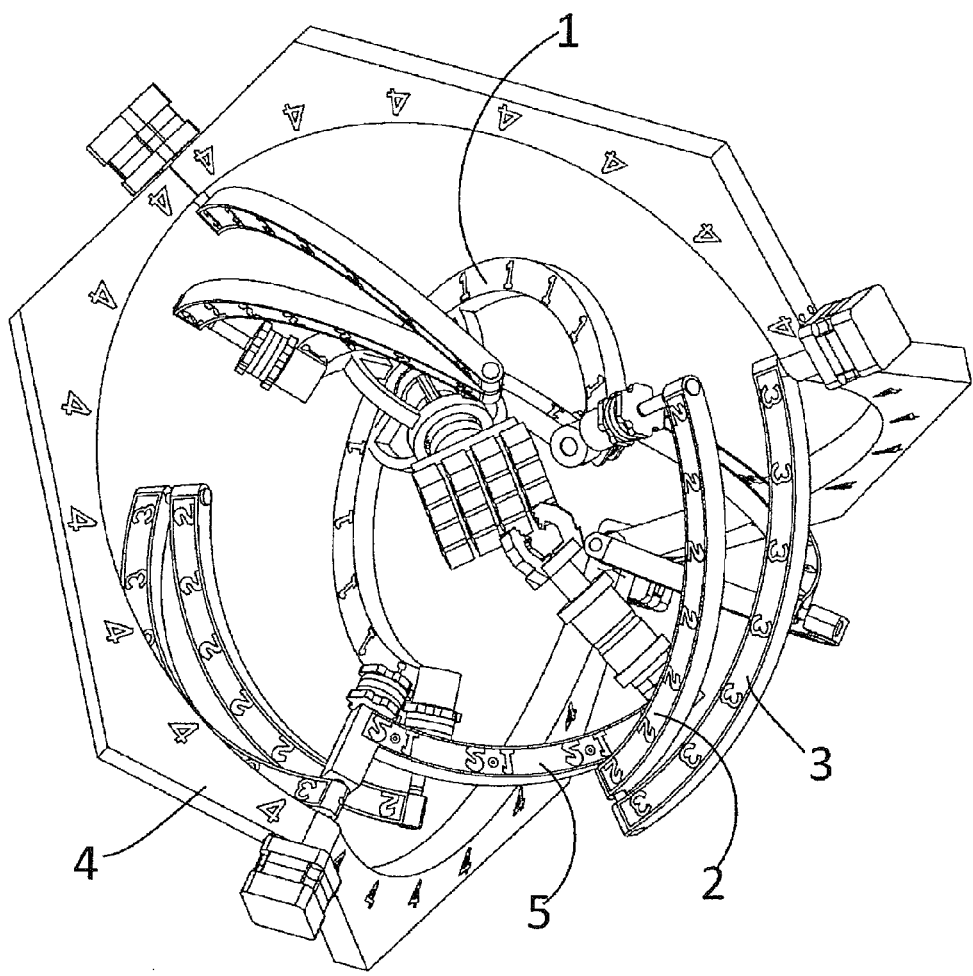
FIG. 1A is a perspective view of a first preferred embodiment showing single outer frame pivotal configuration.
Figure 1B:
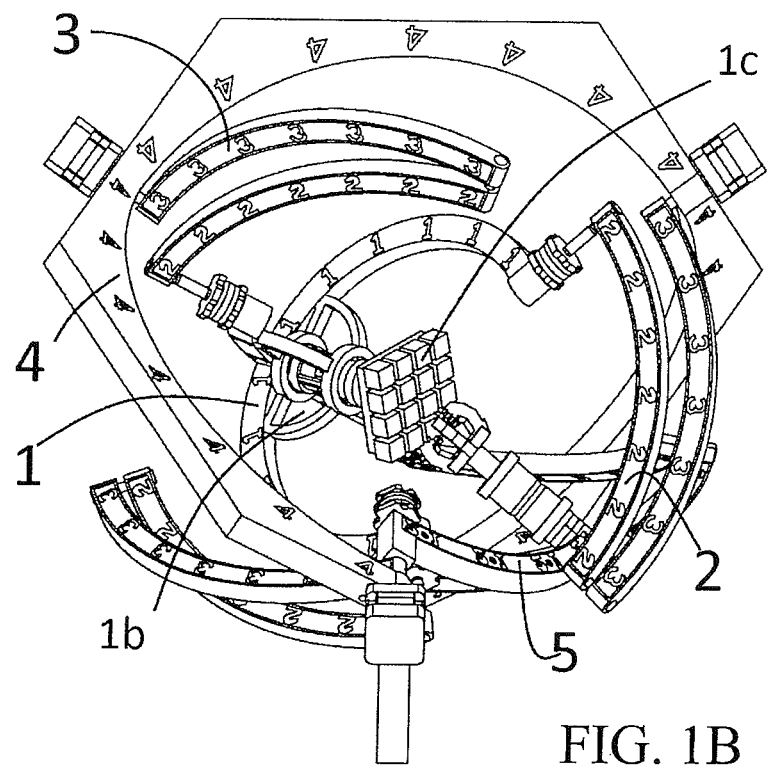
FIG. 1B is a front view of FIG. 1A.
Figure 1C:
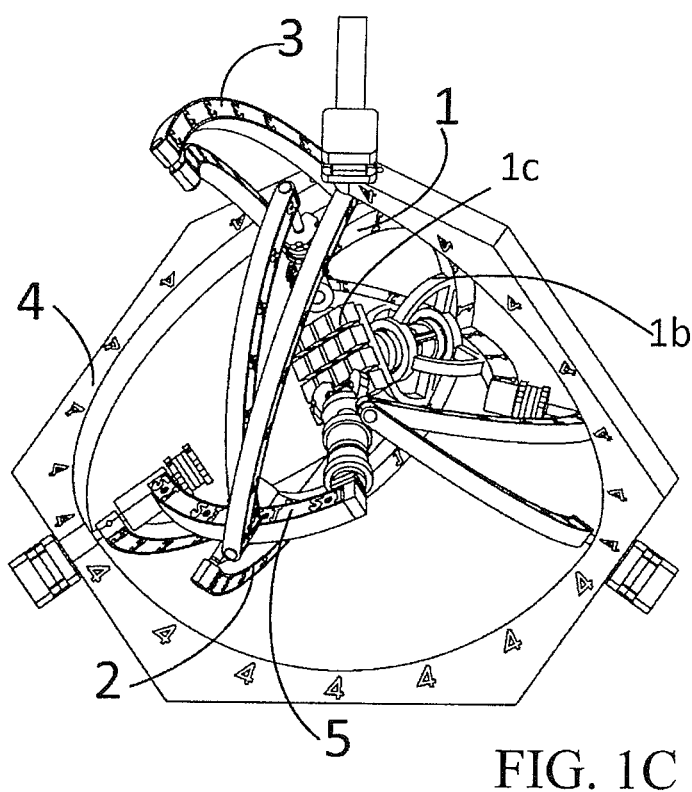
FIG. 1C is a side view of FIG. 1A.

Referring to FIGS. 1A to 1C, a spherical coordinates manipulating mechanism in accordance with the invention comprises an outer frame assembly 4, an inner frame assembly 1, four outer arc-link sets 3, four inner arc-link sets 2, and at least one effector arc-link set 5 selectively connected to an outer frame 4o or an inner frame 10 by using an axle as discussed in detail below.

Figure 2B:
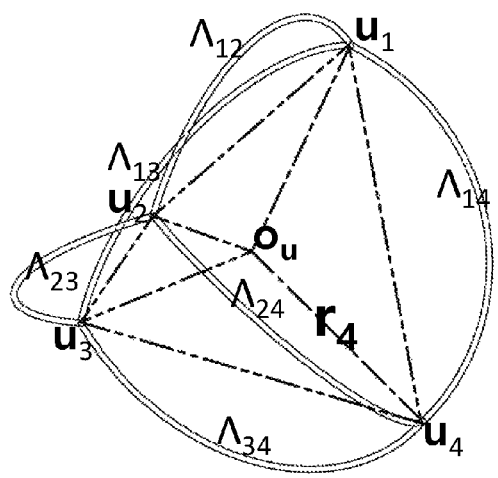
FIG. 2B shows a geometric definition of the outer frame assembly of FIG. 2A.
Figure 2A:
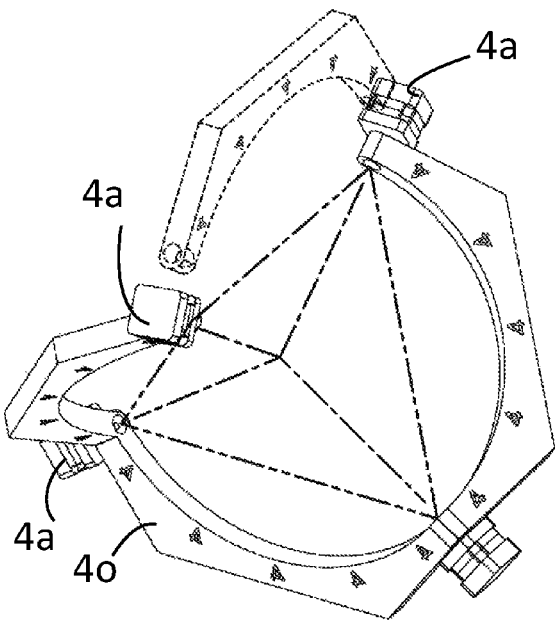
FIG. 2A is a perspective view of the outer frame assembly.
Figure 2D:
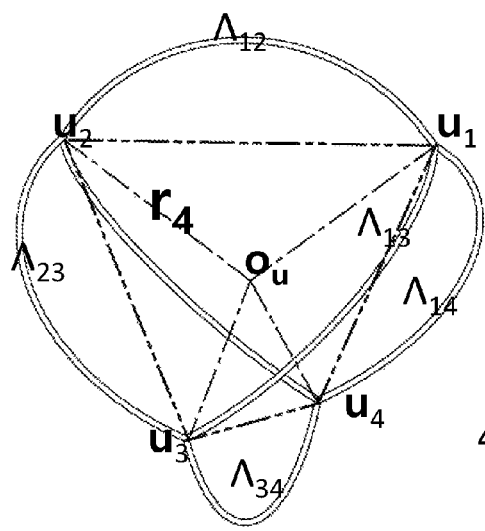
FIG. 2D shows a geometric definition of FIG. 2C.
Figure 2C:
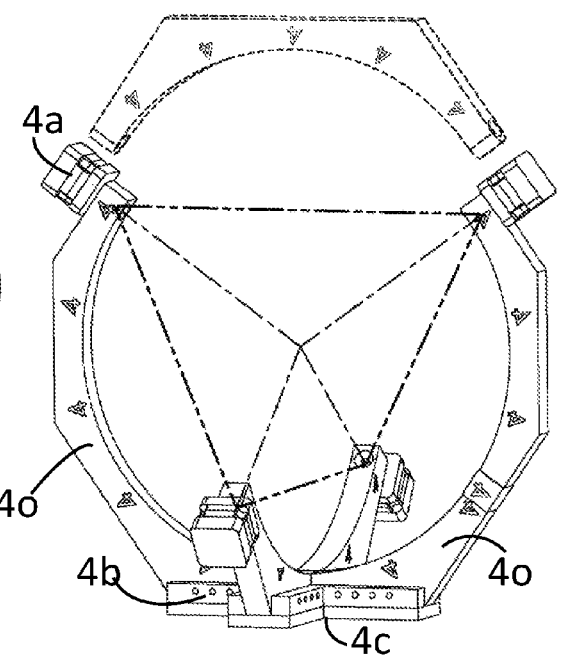
FIG. 2C is a perspective view of another shape of the outer frame assembly.

The outer frame assembly 4 comprises an outer frame 4o, four outer rotating members 4a mounted to the outer frame 4o, an outer support 4b mounted on a bottom of the outer frame 4o, and an outer carrier 4c provided on the outer support 4b. The outer frame 4o is comprised of a plurality of brackets. The outer frame 4o has four vertexes, each denoted by $u_{i\ i=1\sim4}$ which are geometrically defined by an outer tetrahedron. The four vertexes of the outer tetrahedron are equidistant from the notional center of the outer frame 4o. The radius of a geometrical orbit of the outer frame 4o is denoted by $r_4$. The vertex-to-center lines of the outer tetrahedron are coincided with the center of the outer frame 4o denoted by $o_u$. Each outer rotating member 4a may be mounted on an outboard of the outer frame 4o (see FIGS. 2A and 2C) or on an inboard of the outer frame 4o (see FIGS. 4A and 4C). But axis of the outer rotating member is required to coincide with a vertex-to-center line of the outer tetrahedron. An angle between the vertex-to-center line $u_i$ and the other vertex-to-center line $u_j$ is represented by $\Lambda_{ij}$. The radius of the geometrical orbit of the outer frame 4o is denoted by $r_4$, as shown in FIGS. 2B and 2D.

Figure 3A:
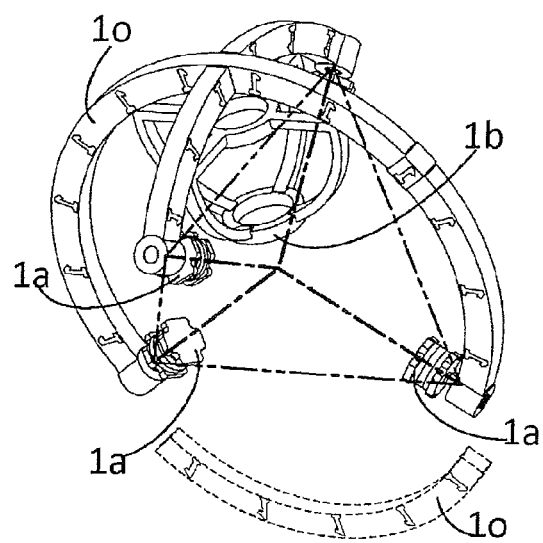
FIG. 3A is a perspective view of the inner frame assembly.
Figure 3B:
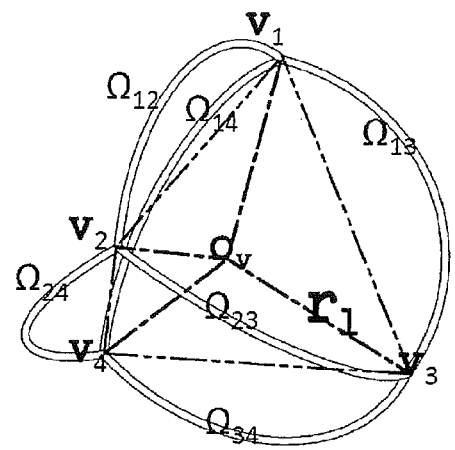
FIG. 3B shows a geometric definition of the inner frame assembly of FIG. 3A.
Figure 3C:
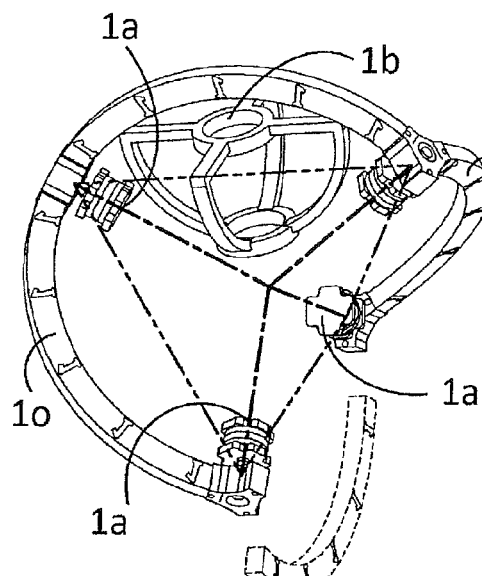
FIG. 3C is a perspective view of another shape of the inner frame assembly.
Figure 3D:
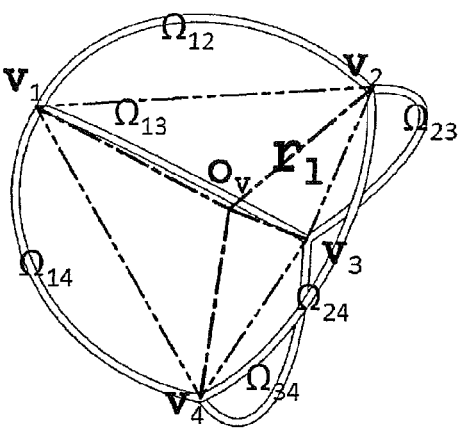
FIG. 3D shows a geometric definition of the outer frame assembly of FIG. 3C.

The inner frame assembly 1 comprises an inner frame 1o, four inner rotating members 1a, an inner support 1b, and an inner carrier 1c. The inner frame 1o is comprised of a plurality of brackets. The inner frame 1o has four vertexes, each denoted by $v_{i\ i=1\sim4}$ which are geometrically defined by an inner tetrahedron. The four vertexes of the inner tetrahedron are equidistant from the notional center of inner frame 1o. The radius of a geometrical orbit of the inner frame 1o is denoted by $r_1$. The vertex-to-center lines of the inner tetrahedron are coincided with the center of the inner frame 10 denoted by $o_v$. Each inner rotating member 1a may be mounted on an inboard of the inner frame 1o (see FIGS. 3A and 3C) or on an outboard of the inner frame 1o (see FIGS. 4B and 4D). But axis of the inner rotating member is required to coincide with a vertex-to-center line of the inner tetrahedron. An angle between the vertex-to-center line $v_i$ and the other vertex-to-center line $v_j$ is represented by $\Omega_{ij}$, as shown in FIGS. 3B and 3D.

The outer frame 4o or the inner frame 1o can be designed as closed-loop or open-loop structure. Closed-loop design can enhance rigidity to avoid vibration or deformation. Open-loop design can reduce interference when rotating (see FIGS. 4A-4C). As disclosed by U.S. Pat. No. 8,579,714 B2, if the outer frame 4o or the inner frame 1o is geometrically shaped as a regular tetrahedron, the regular tetrahedron frame may be easily designed and simulated due to its simple and symmetry. Thus, six angles defined by each pair of vertex-to-center lines of the outer frame 4o are equal, approximately 109.5°, that is, $\Lambda_{12}$-$\Lambda_{13}$-$\Lambda_{14}$-$\Lambda_{23}$-$\Lambda_{24}$-$\Lambda_{34}$≈109.5°. The six angles defined by each pair of vertex-to-center lines of the inner frame 10 are equal, approximately 109.5°, that is, $\Omega_{12}$-$\Omega_{13}$-$\Omega_{14}$-$\Omega_{23}$-$\Omega_{24}$-$\Omega_{34}$≈109.5°. It is to be noted that the regular tetrahedron is a configuration most likely to have singularities. Therefore, for avoiding the singularities, it is preferred that neither the outer frame 4o nor the inner frame 1o is defined as a regular tetrahedron.

Figure 5A:
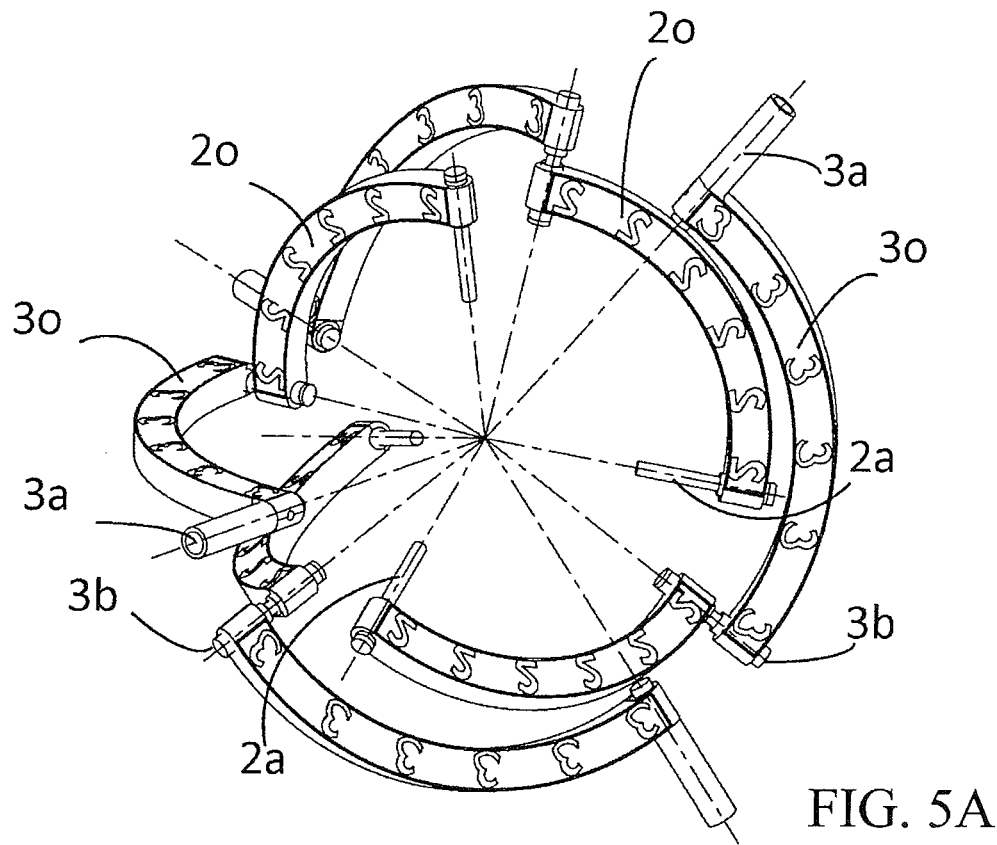
FIG. 5A is a perspective view of the four inner arc-link sets and the four outer arc-link sets.

Regarding each outer arc-link set 3 and each inner arc-link set 2, an outer arc-link 3o has its outbound end pivotal about an outer rotating member 4a through an outer axle 3a. An inner arc-link 2o has its inbound end pivotal about an inner rotating member 1a through an inner axle 2a. The inbound end of the outer arc-link 3o is pivotal about the outbound end of the inner arc-link 2o through a middle axle 3b. Such pivotally connected an outer arc-link 3o and an inner arc-link 2o are defined to be an arc-link serial set (see FIG. 5A). The outer axle 3a must be coincided with a vertex-to-center line of the outer tetrahedron for concentrically rotating the outer arc-link 3o into a predetermined orbit. The radius of a geometrical orbit of the outer arc-link 3o is denoted by $r_3$ The inner axle 2a must be coincided with a vertex-to-center line of the inner tetrahedron for concentrically rotating the inner arc-link 2o into a predetermined orbit. The radius of geometrical orbit of the inner arc-link 2o is denoted by $r_2$.

Figure 5B:
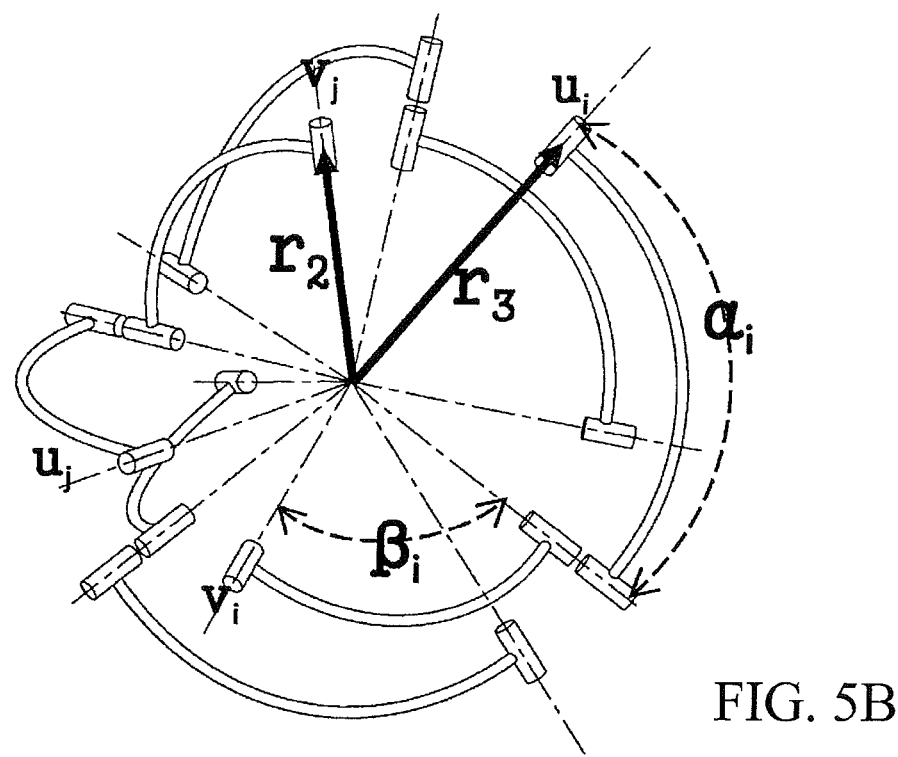
FIG. 5B shows a geometric definition of FIG. 5A.

The arc length of the outer arc-link 3o is represented by $\alpha_i$, and is defined as a sector between the outer axle 3a and the middle axle 3b. The arc length of the inner arc-link 2o is represented by $\beta_i$ and is defined as a sector between the inner axle 2a and the middle axle 3b. All the axes of the outer arc-link 3o and the inner arc-link 2o must be concentric to ensure the outer frame 4o and the inner frame 1o to be concentric. In other words, no matter how the outer axles 3a, the middle axle 3b, and the inner axles 2a move in response to the posture variation, they must point to the notional center of the outer frame 4o and the inner frame 1o, as shown in FIG. 5B.

As disclosed by U.S. Pat. No. 8,579,714 B2, the sum of arc lengths of any outer arc-link and the corresponding inner arc-link must be less than or equal to 180°, or the design is meaningless, namely $\alpha_i+\beta_i \leq 180°$. The sum of the arc lengths of any two of the outer arc-links 3o must be greater than or equal to an angle between their corresponding vertex-to-center lines of the outer frame 4o, namely $\alpha_i+\alpha_j \geq \Lambda_{ij}$. The sum of the arc lengths of any two of the inner arc-links 2o must be equal to or greater than an angle between their corresponding vertex-to-center lines of the inner frame 1o, namely $\beta_i+\beta_j \geq \Omega_{ij}$. For the sake of avoiding singularities, arc lengths of four outer arc-links 3o are not required to be equal, and arc lengths of four inner arc-links 2o are not required to be equal.

Each outer rotating member 4a or each inner rotating member 1a is implemented as a torque output device (e.g., motor or hydraulic rotational cylinder), an angle sensor (e.g., optical encoder), or a bearing. At least one of the outer rotating member 4a connected to the inner arc-link 2o and the inner rotating member 1*a* connected to the outer arc-link 3*o* is implemented as a torque output device. That is, for each arc-link serial set, at least one of outer rotating member 3*a* and inner rotating member 1*a* connected thereto is a torque output device.

Improvements of the invention over U.S. Pat. No. 8,579, 714 B2 are the provision of at least one effector arc-link set 5 as discussed in detail below by referring to FIGS. 6A-6C and FIGS. 7A-7C. The effector arc-link set 5 comprises an effector arc-link 5*x* and an effector rotating member 5*a* and an end effector 5*e*. One of the two ends of the effector arc-link 5*x* must be coincided with a vertex-to-center line of outer tetrahedron or inner tetrahedron for concentrically rotating the effector arc-link 5*x* into a predetermined orbit. Arc length of the effector arc-link 5*x* is less than or equal to 90° and is denoted by δ, that is δ≤90°. The end effector 5*e* can be actuated by an effector rotating member 5*a* to avoid being interfered by any inner arc-link 2*o* or any outer arc-link 3*o*. Thus, pivot angle and moment of a spherical coordinates can be carried out. The effector rotating member 5*a* can be a torque output device or a device for fastening rotational member so as to fasten the effector arc-link 5*x* and prevent the inner frame 1*o* or the outer frame 4*o* from being interfered by the effector arc-link 5*x*.

Figure 8A:
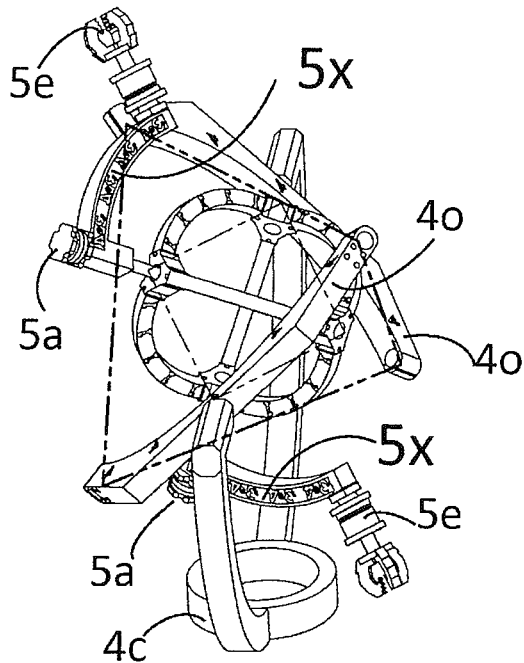
FIG. 8A is a perspective view of two effector arc-link sets pivotally connected to the inner frame with yoke type outer frame.
Figure 8B:
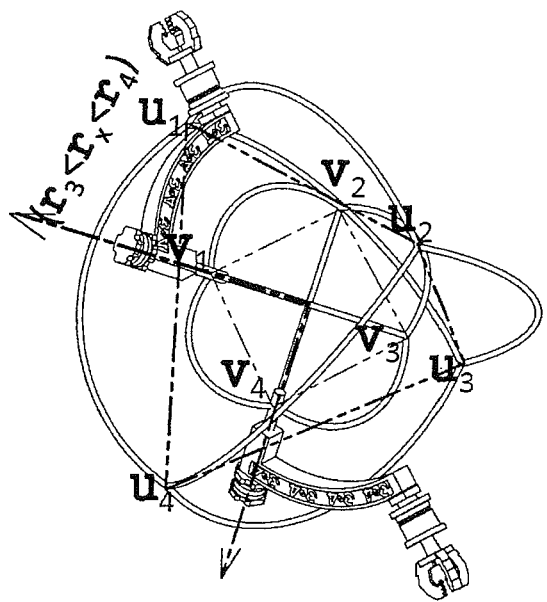
FIG. 8B shows a geometric definition of FIG. 8A.
Figure 8C:
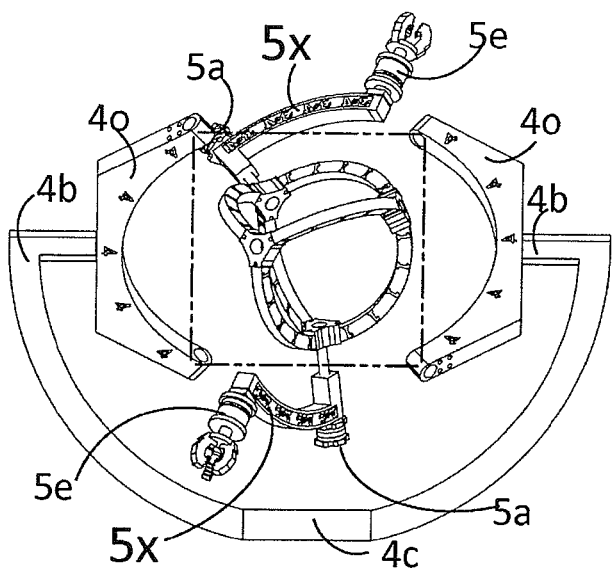
FIG. 8C is another perspective view of two effector arc-link sets pivotally connected to the inner frame with yoke type outer frame of FIG. 8A.
Figure 8D:
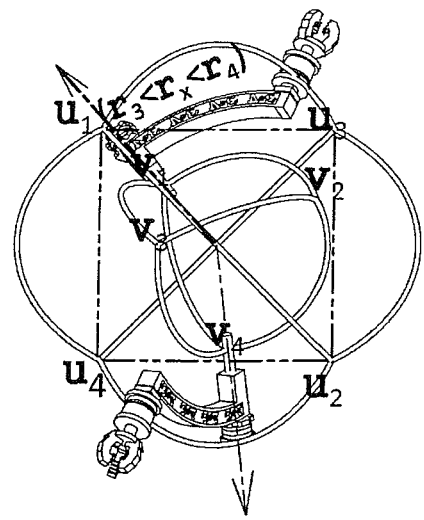
FIG. 8D shows a geometric definition of FIG. 8C.

The outer frame 4*o* and the outer support 4*b* can be employed to constitute a yoke type outer frame (see FIGS. 8A and 8C). The geometric definition of the yoke type outer frame and two effector arc-links 5*x* is shown in FIGS. 8B and 8D. The inner frame 1*o* and the inner support 1*b* can be employed to constitute a yoke type inner frame (see FIGS. 9A and 9C). The geometric definition of the yoke type inner frame and two effector arc-links 5*x* is shown in FIGS. 9B and 9D.

An effector arc-link set 5 of the invention can be implemented as either outer frame pivotal configuration or inner frame pivotal configuration as discussed below.

Figure 6C:
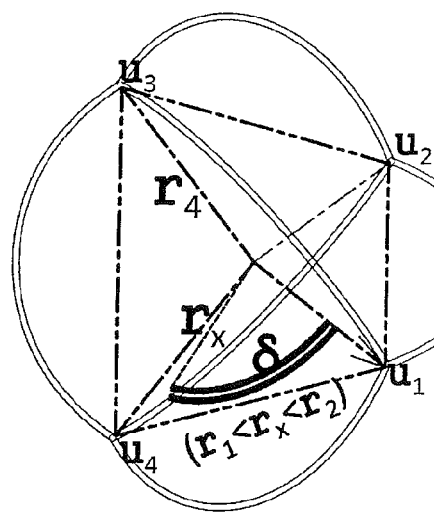
FIG. 6C shows a geometric definition of FIG. 6A.
Figure 6B:
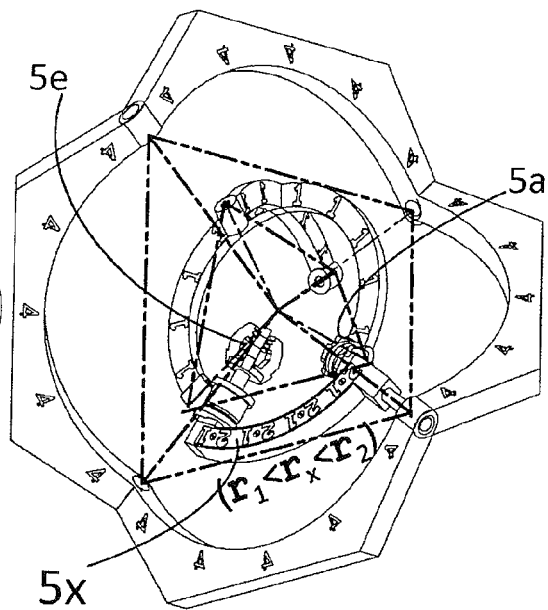
FIG. 6B is a focus view of an effector arc-link set of FIG. 6A.
Figure 6A:
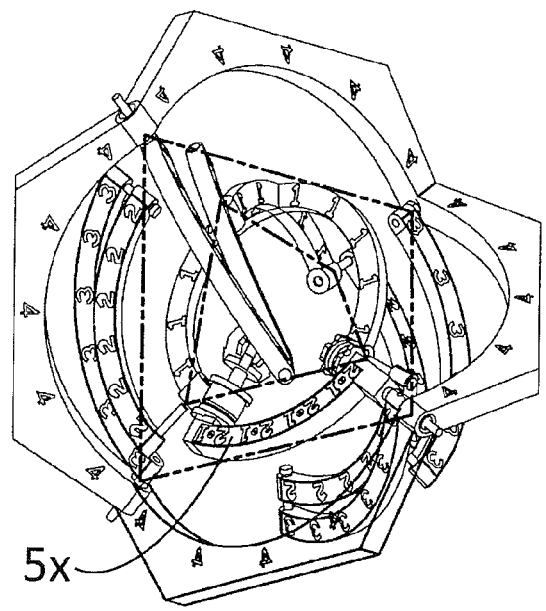
FIG. 6A is a perspective view of an effector arc-link set pivotally connected to the outer frame.

As shown in FIGS. 6A-6C, an effector arc-link set 5 pivotally connected to an outer frame 4*o* is characterized by that an effector arc-link 5*x* is pivotally connected to the outer frame 4*o* and pivots with outbound end of an outer arc-link 3*o*, and an axis of outbound end of the effector arc-link 5*x* is coincided with a vertex-to-center line of the outer tetrahedron for concentrically rotating around an orbit between inner frame to and each inner arc-links 2*o*. The geometric definition of the outer frame pivotal configuration is $r_1 < r_x < r_2$. The end effector 5*e* is radially disposed on inboard of inbound end of the effector arc-link 5*x*. The effector rotating member 5*a* is pivotally connected on outboard of inbound end of the effector arc-link 5*x* and radially pivots with the end effector 5*e*. The outer frame 4*o* can be designed as a closed-loop structure to enhance rigidity in order to avoid vibration or deformation. The inner frame 1*o* can be designed as an open-loop structure to reduce interference by the effector arc-link 5*x* when the inner frame 1*o* rotates. The end effector 5*e* can be a clamp, such as a clamp of a lathe. Other applications such as multi-shaft composite machining centers and multiple measurement devices are possible. An outer support 4*b* is provided on the outer frame 4*o*, and an outer carrier 4*c* is provided on the outer support 4*b* for disposing a clamping device or a positioning platform as illustrated in a first embodiment, namely: single outer frame pivotal configuration (see FIGS. 1A to 1C).

Figure 7C:
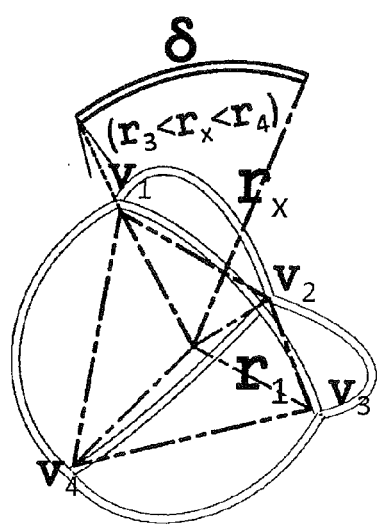
FIG. 7C shows a geometric definition of FIG. 7A.
Figure 7B:
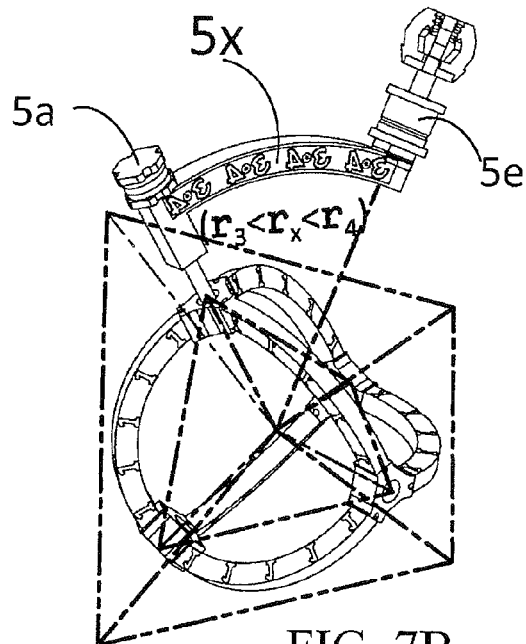
FIG. 7B is a focus view of an effector arc-link set of FIG. 7A.
Figure 7A:
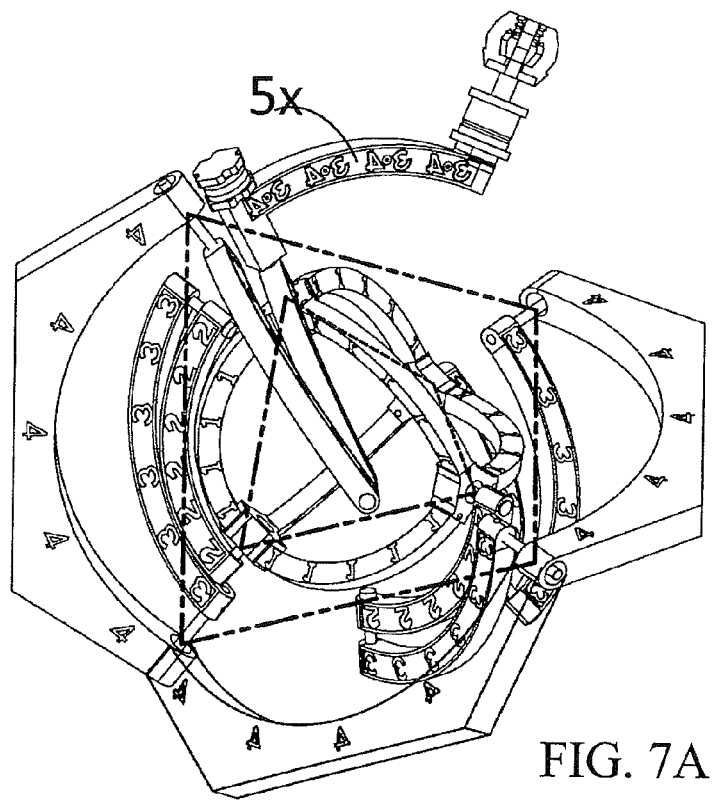
FIG. 7A is a perspective view of an effector arc-link set pivotally connected to the inner frame.
Figure 10A:
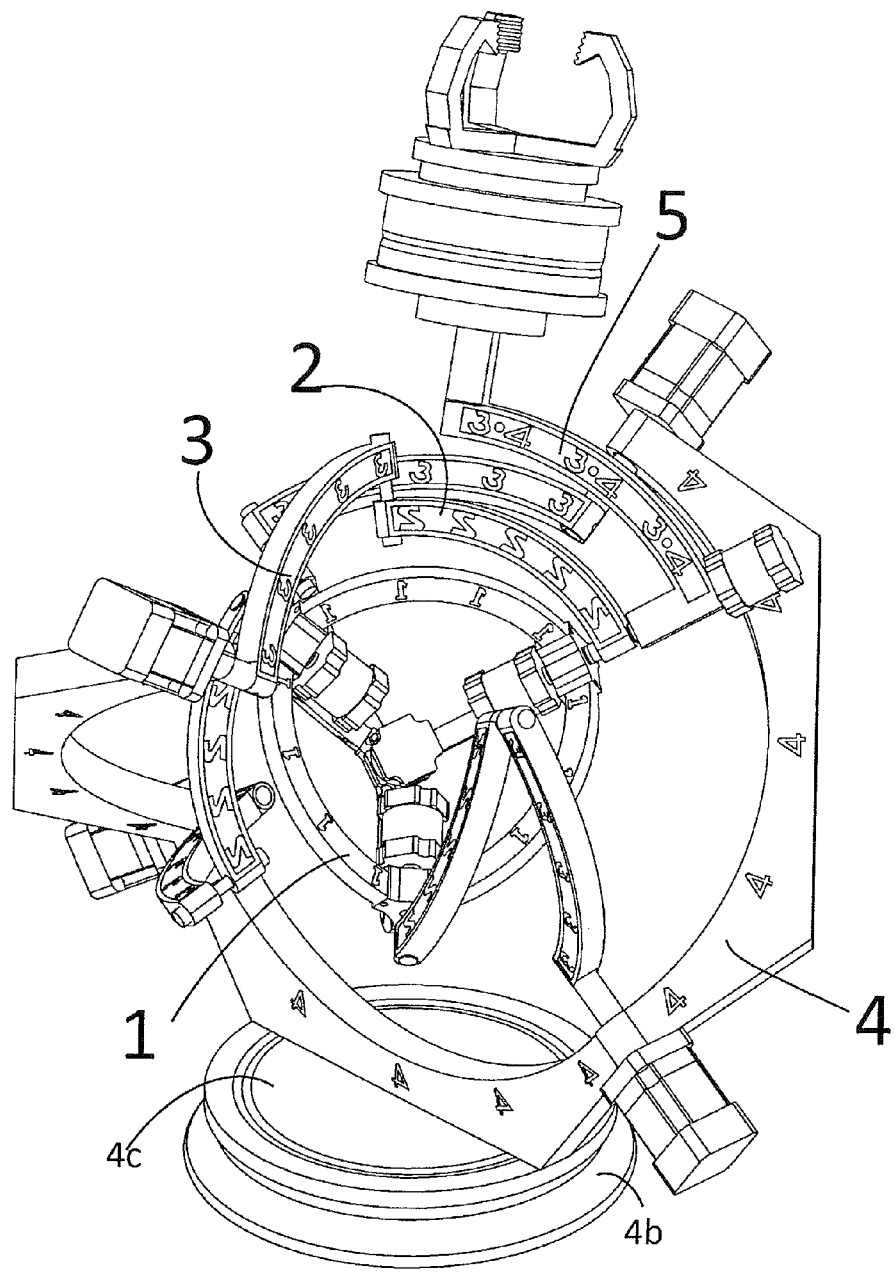
FIG. 10A is a perspective view of a second preferred embodiment showing single inner frame pivotal configuration.
Figure 10B:
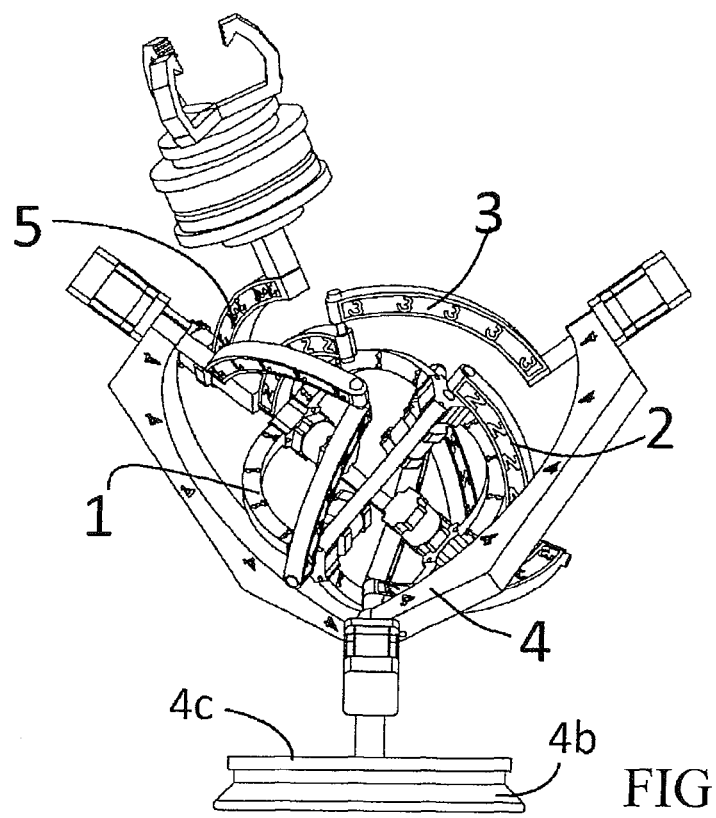
FIG. 10B is a front view of FIG. 10A.
Figure 10C:
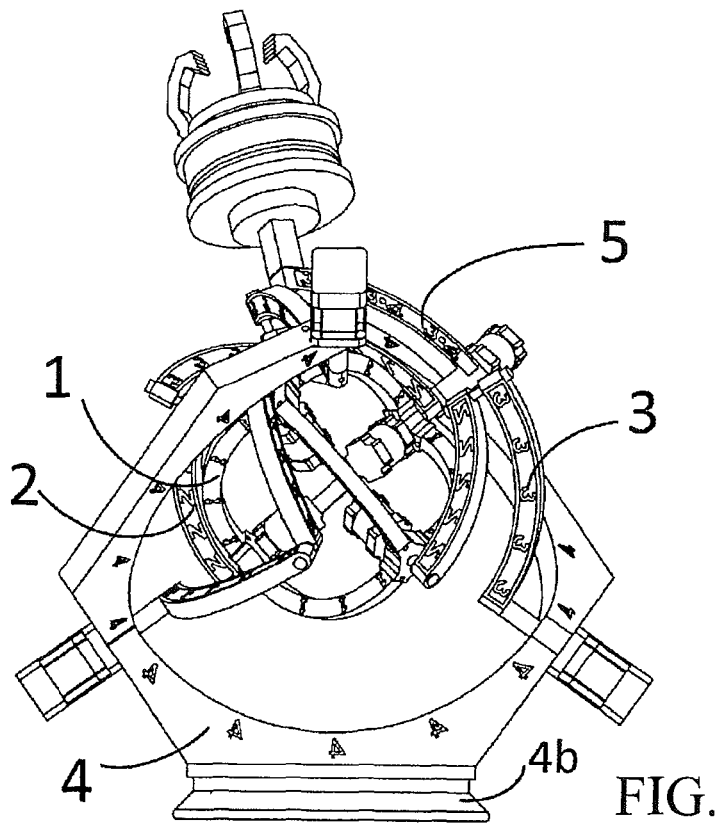
FIG. 10C is a side view of FIG. 10A.

As shown in FIGS. 7A-7C, an effector arc-link set 5 pivotally connected to an inner frame 1*o* is characterized by that an effector arc-link 5*x* is pivotally connected to the inner frame 1*o* and pivots with the inbound end of an inner arc-link 2*o*, and an axis of inbound end of the effector arc-link 5*x* is coincided with a vertex-to-center line of the inner tetrahedron for concentrically rotating around an orbit between outer frame 4*o* and each outer arc-links 3*o*. The geometric definition of the inner frame pivotal configuration is $r_3 < r_x < r_4$. The end effector 5*e* is radially disposed on outboard of outbound end of the effector arc-link 5*x*. The effector rotating member 5*a* is pivotally connected on inboard of outbound end of the effector arc-link 5*x* and radially pivots with the end effector 5*e*. The inner frame 1*o* can be designed as a closed-loop structure to enhance rigidity to avoid vibration or deformation. The outer frame 4*o* can be designed as an open-loop structure to reduce interference by the effector arc-link 5*x* when the outer frame 4*o* rotates. The end effector 5*e* can be provided with a lifting mechanism having an extendable piston rod as implemented in pneumatic cylinders, hydraulic cylinders or electric threaded rod. Applications include a robot's shoulder joint and hip joint. This is illustrated in a second embodiment, namely: single inner frame pivotal configuration (see FIGS. 10A to 10C). An inner support 1*b* is provided on the inner frame 1*o*, and an inner carrier 1*c* is provided on the inner support 1*b*. The inner carrier 1*c* can be weight plate for balance and reducing moment variation as applied in robot arms when moving large objects which requires large inertia or great torque variations (see FIG. 10D and 10E).

The effector arc-link set 5 can be provided in either a single installation or double installation in terms of the number of the effector arc-link set 5. The single installation (i.e., single outer frame pivotal configuration and single inner frame pivotal configuration discussed above) has only one effector arc-link set 5 and the double installation has two effector arc-link sets 5. While the double installation may cause the spherical coordinates manipulating mechanism of the invention be interfered by either the inner frame 10 or the outer frame 4*o*, resulting in a reduction of motion space, but it may induce more applications due to the provision of an extra effector arc-link set. The invention can be embodied in the following preferred embodiments involving a double outer frame pivotal configuration and double inner frame pivotal configuration as discussed in detail below.

Figure 11A:
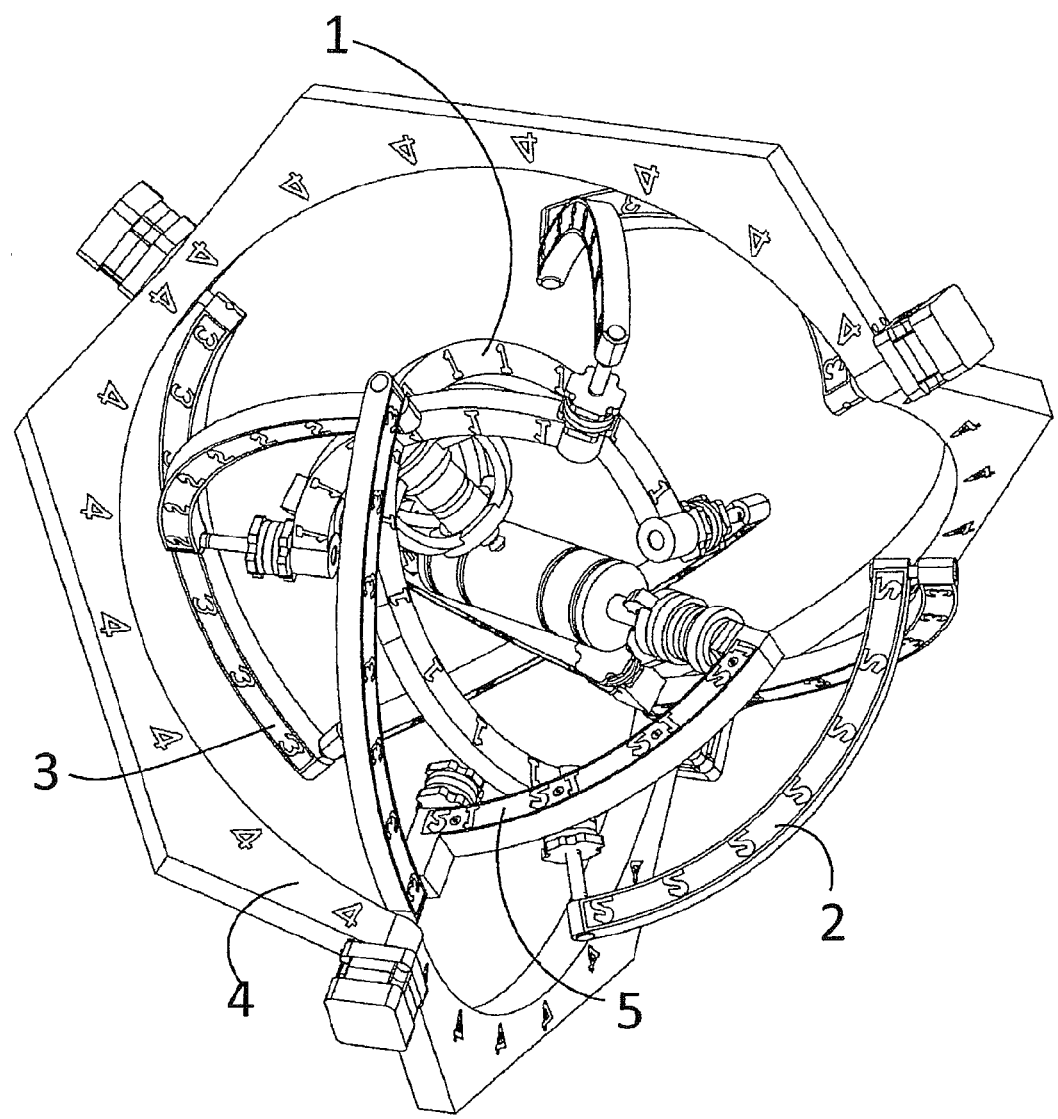
FIG. 11A is a perspective view of a third preferred embodiment showing double outer frame pivotal configuration.
Figure 11B:
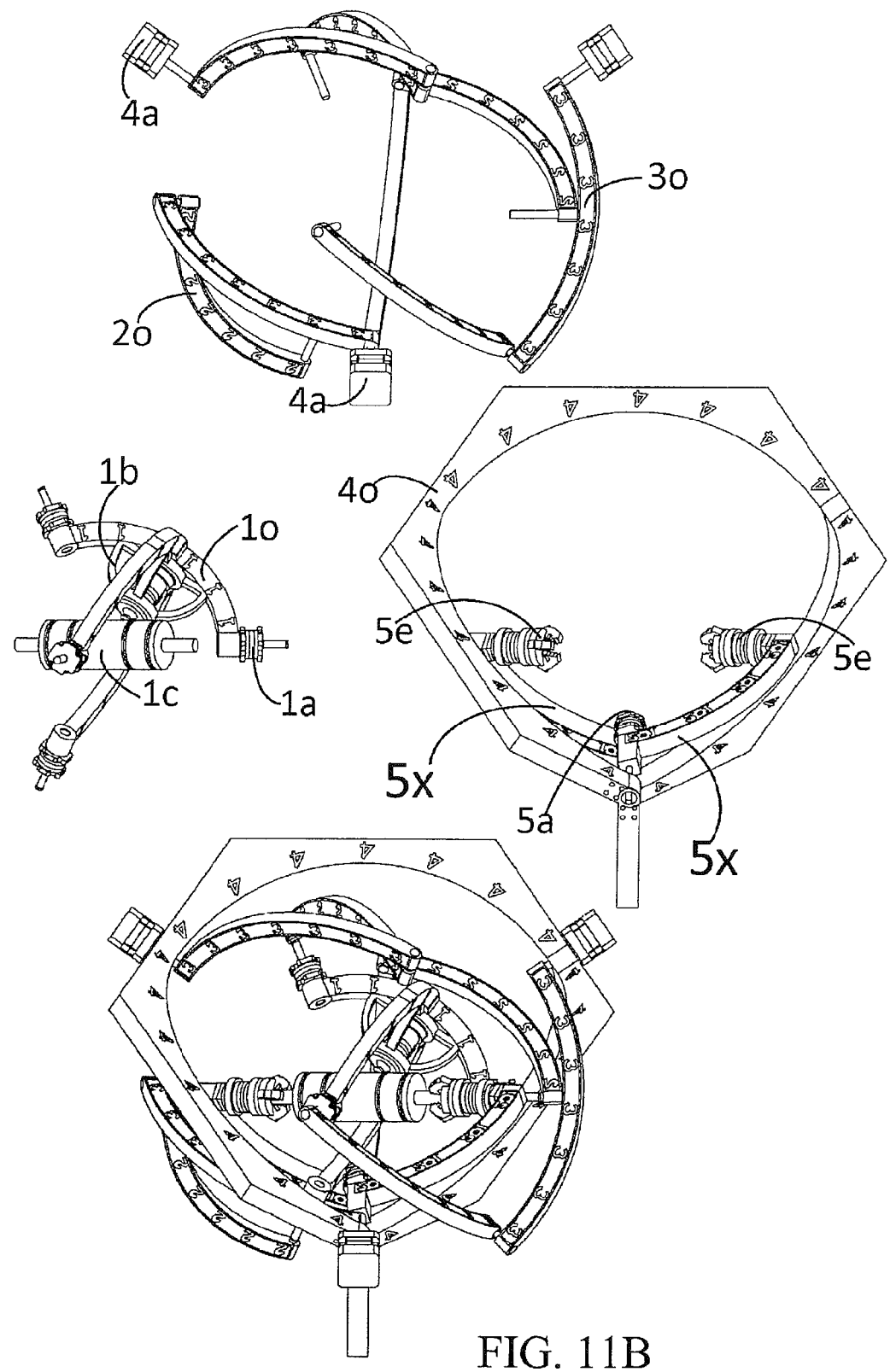
FIG. 11B is a front exploded view of FIG. 11A.
Figure 11C:
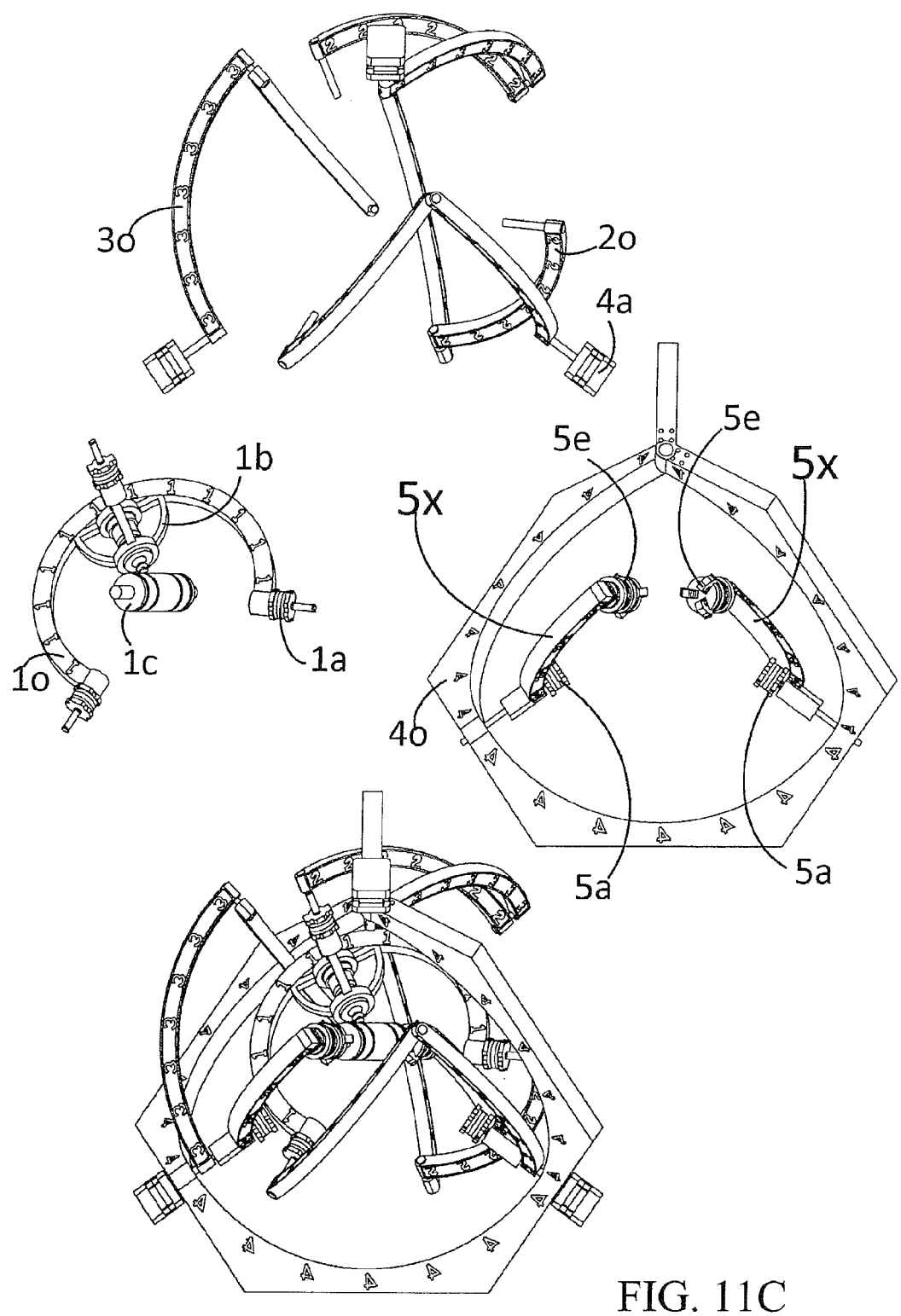
FIG. 11C is a side exploded view of FIG. 11A.

Referring to FIGS. 11A to 11C, a third preferred embodiment, namely: double outer frame pivotal configuration is shown. This embodiment is directed to two effector arc-links 5*x* pivotally connected to the outer frame 4*o*. The outer frame 4*o* can be designed as closed-loop and the inner frame 1*o* can be designed as open-loop. The two effector arc-links 5*x* are orbited between the inner frame 1*o* and each inner arc-link 2*o*. The geometric orbit definition is $r_1 < r_x < r_2$. The two end effectors 5*e* are opposite in the outer frame 4*o*. The end effector 5*e* is adapted to support a clamp of a lathe. The inner carrier 1*c* on the inner support 1*b* can be mounted with a shaft of a laser cutter or a drill as applied in multi-shaft composite machining centers.

Figure 12A:
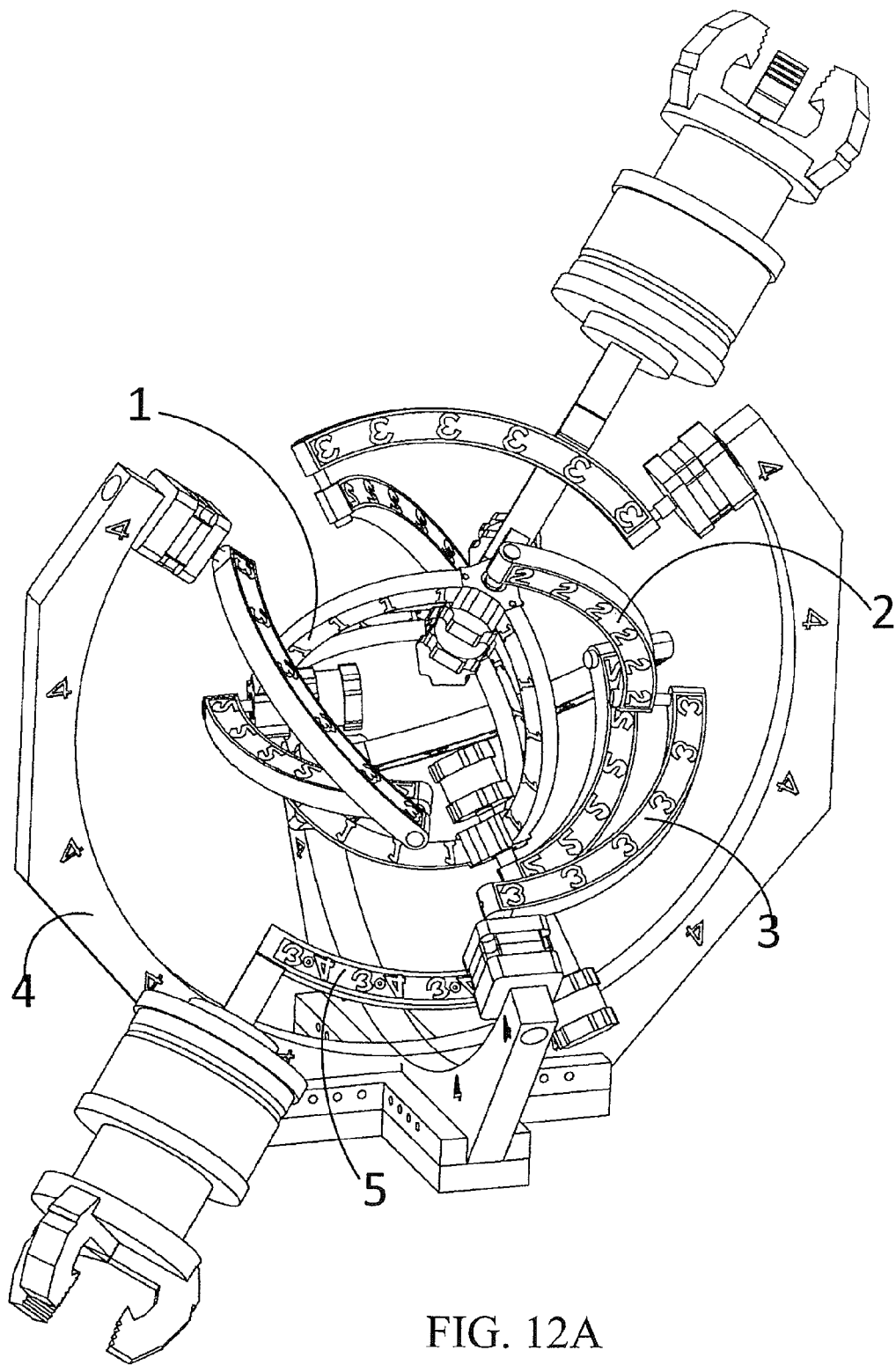
FIG. 12A is a perspective view of a fourth preferred embodiment showing double inner frame pivotal configuration.
Figure 12B:
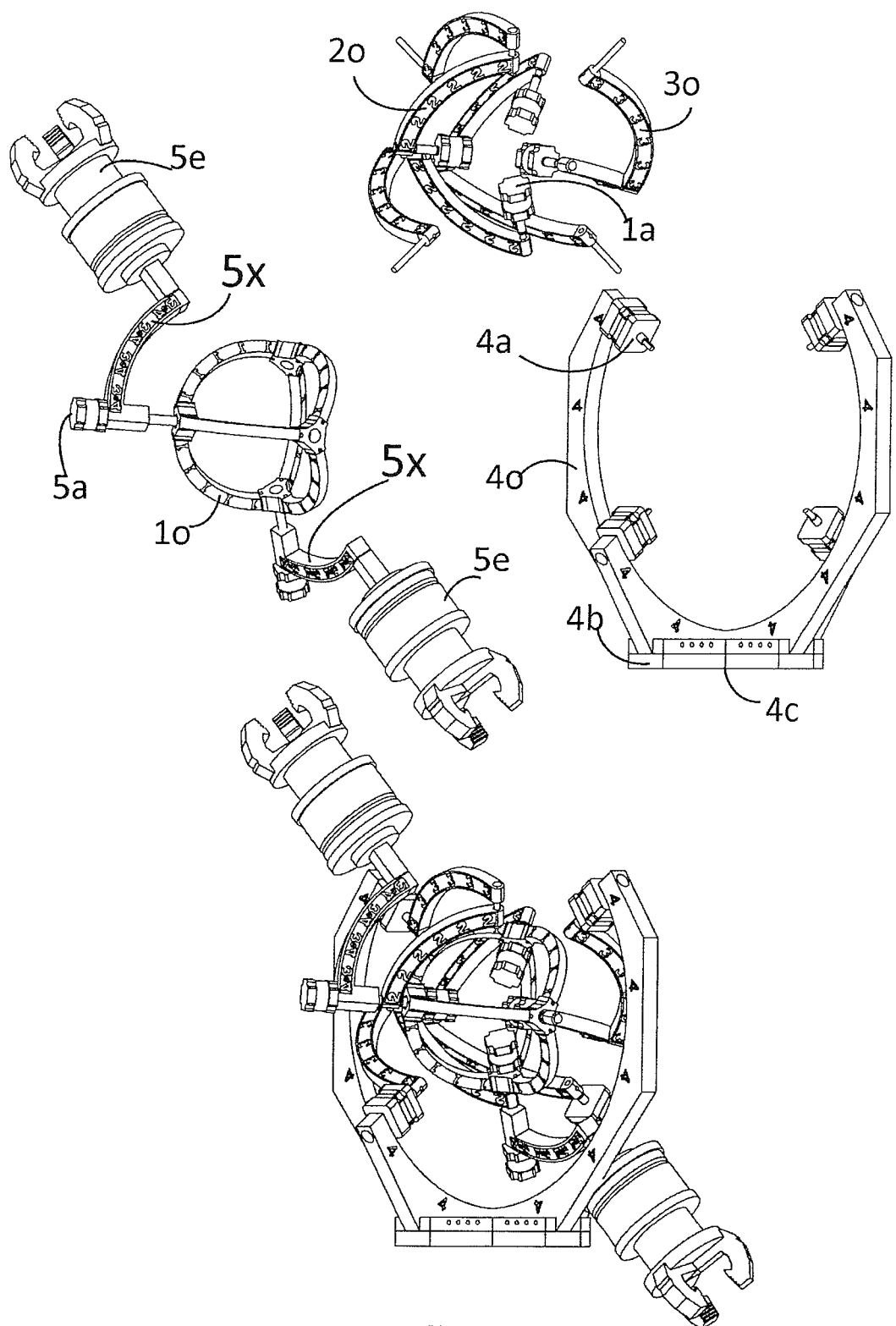
FIG. 12B is a front exploded view of FIG. 12A.
Figure 12C:
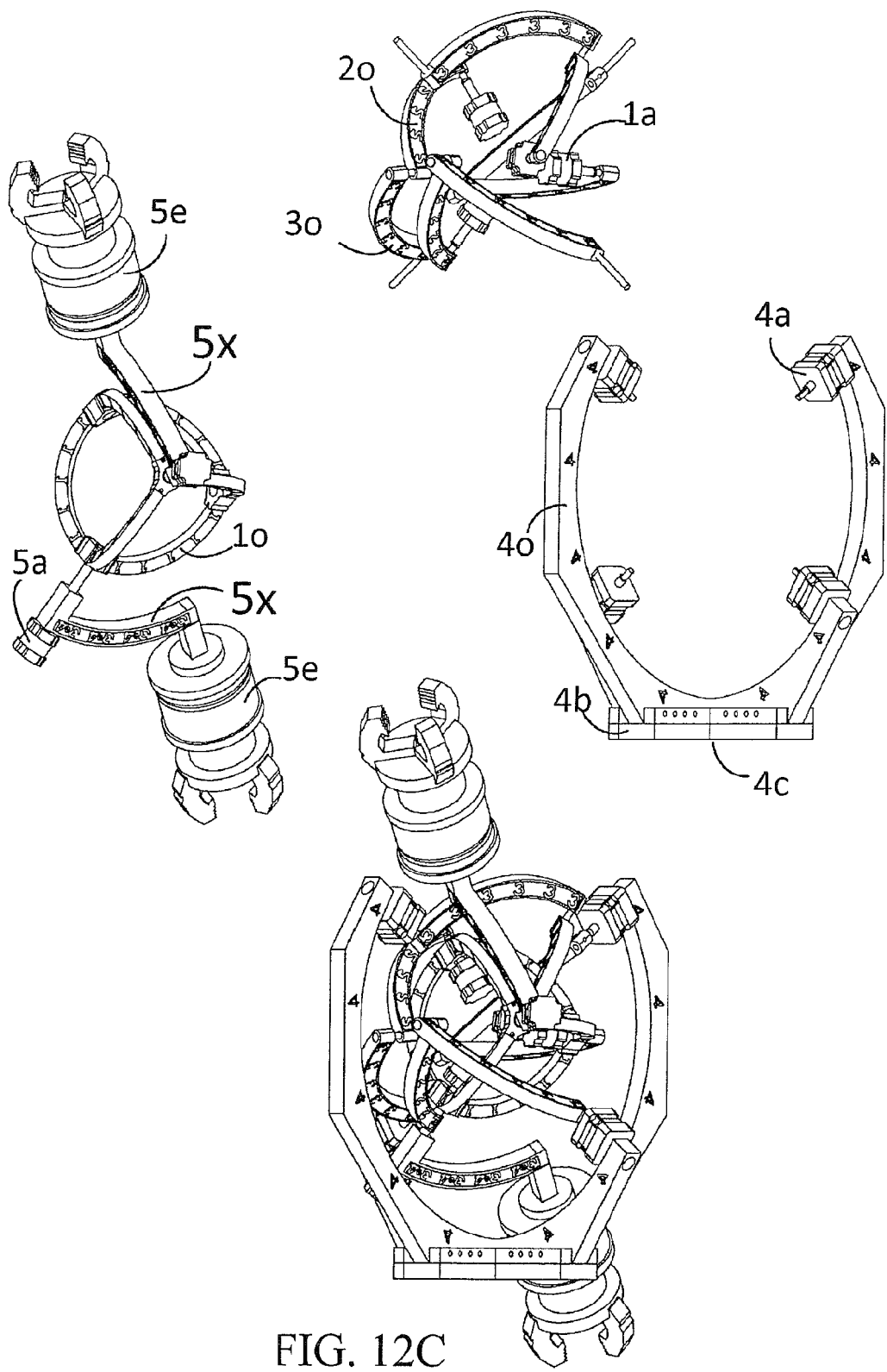
FIG. 12C is a side exploded view of FIG. 12A.

Referring to FIGS. 12A to 12C, a fourth preferred embodiment, namely: double inner frame pivotal configuration is shown. This embodiment is directed to two effector arc-links 5*x* pivotally connected to the inner frame 1*o*. The inner frame 10 can be designed as closed-loop and the outer frame 4*o* can be designed as open-loop. The two effector arc-links 5*x* are orbited between the outer frame 4*o* and each outer arc-link 3*o*. The geometric orbit definition is $r_3 < r_x < r_4$. The two end effectors 5*e* are opposite in the inner frame 1*o*. The outer carrier 4*c* on the outer support 4*b* can be mounted with two opposite lifting mechanisms for balance and decreasing torque variation. It has applications in robot arms for moving objects which requires large inertia or great torque variations.

The provision of the yoke type frame can prevent the either the outer frame 4o or the inner frame 10 from being interfered by the end effectors 5e especially in the double installation. The invention can be embodied in the following preferred embodiments involving a double outer frame pivotal configuration with yoke type inner frame, and a double inner frame pivotal configuration with yoke type outer frame as discussed in detail below.

Figure 13A:
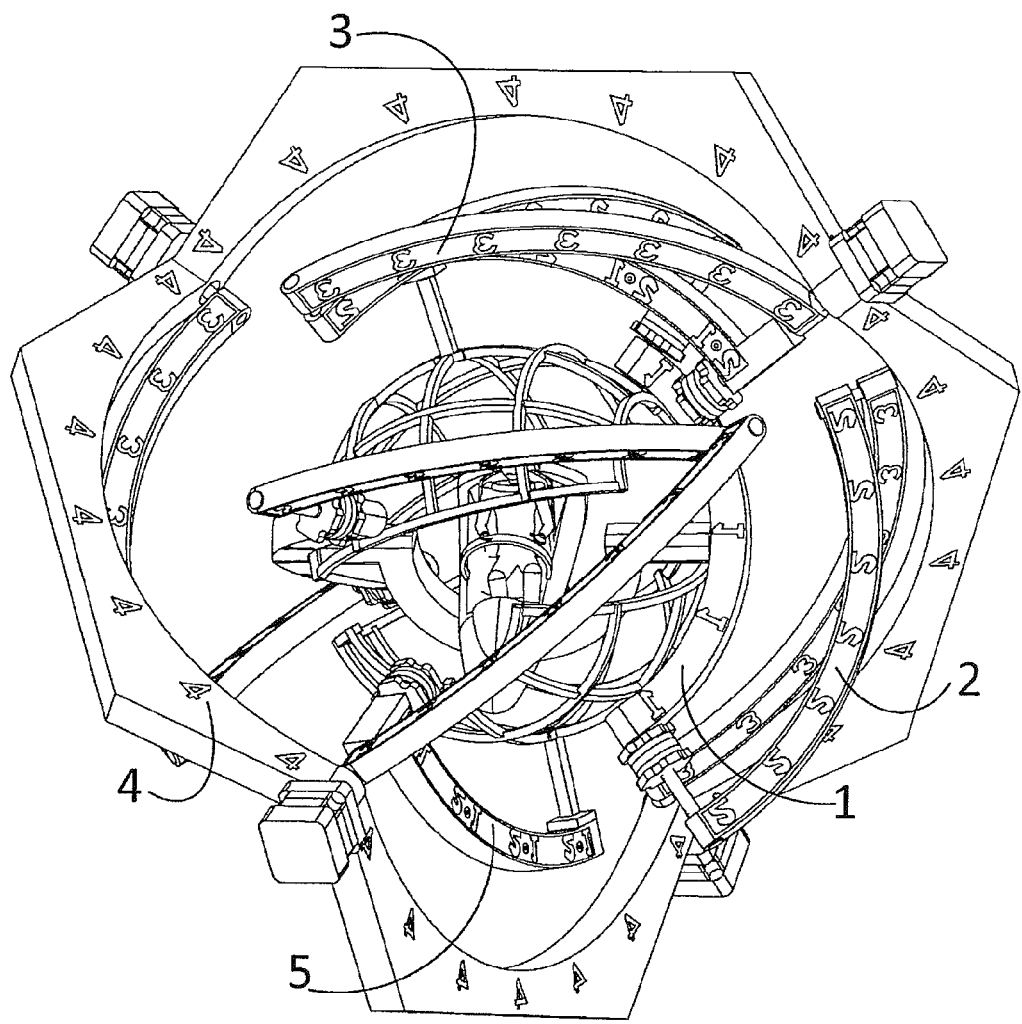
FIG. 13A is a perspective view of a fifth preferred embodiment showing double outer frame pivotal configuration with yoke type inner frame.
Figure 13B:
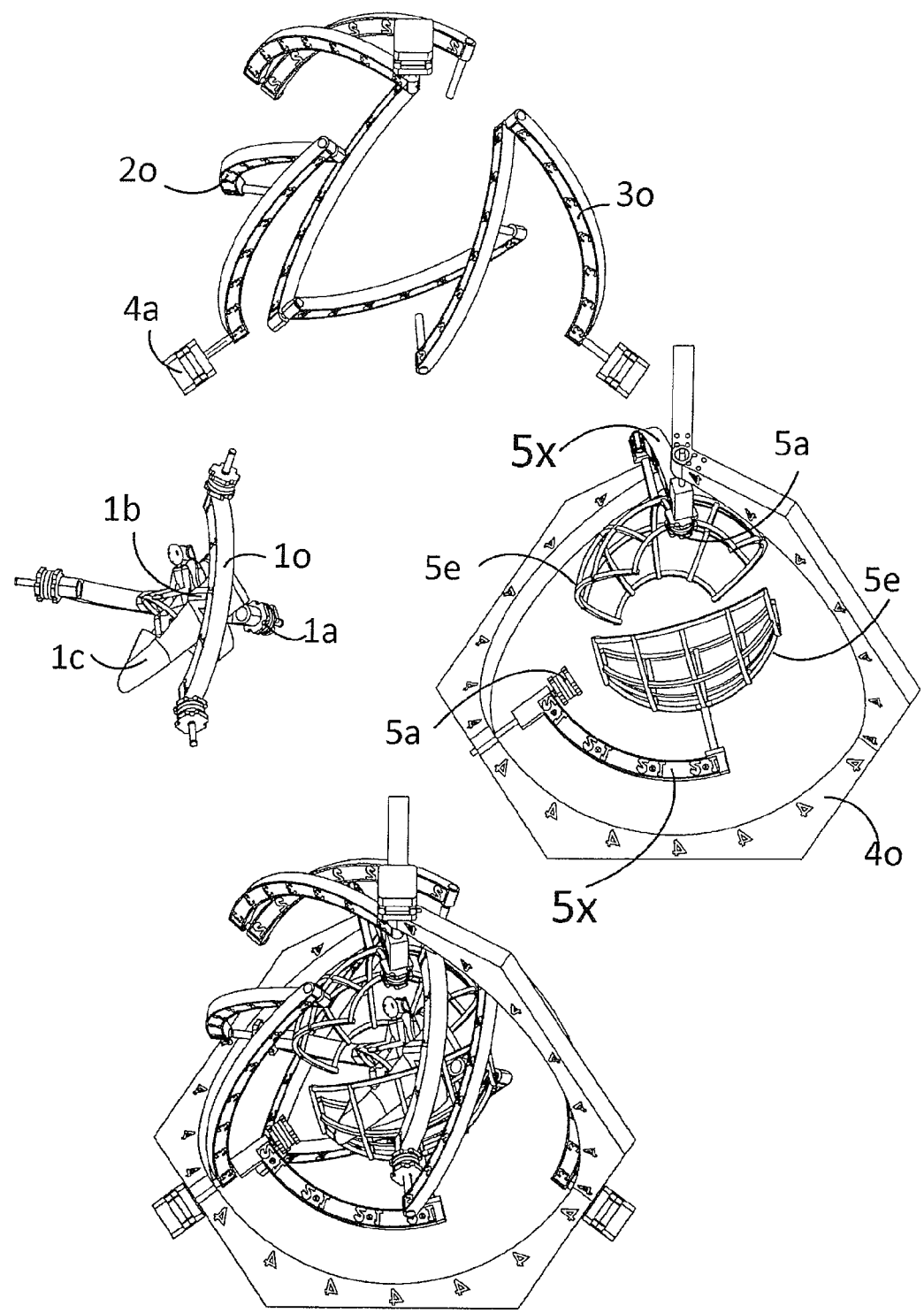
FIG. 13B is a front exploded view of FIG. 13A.
Figure 13C:
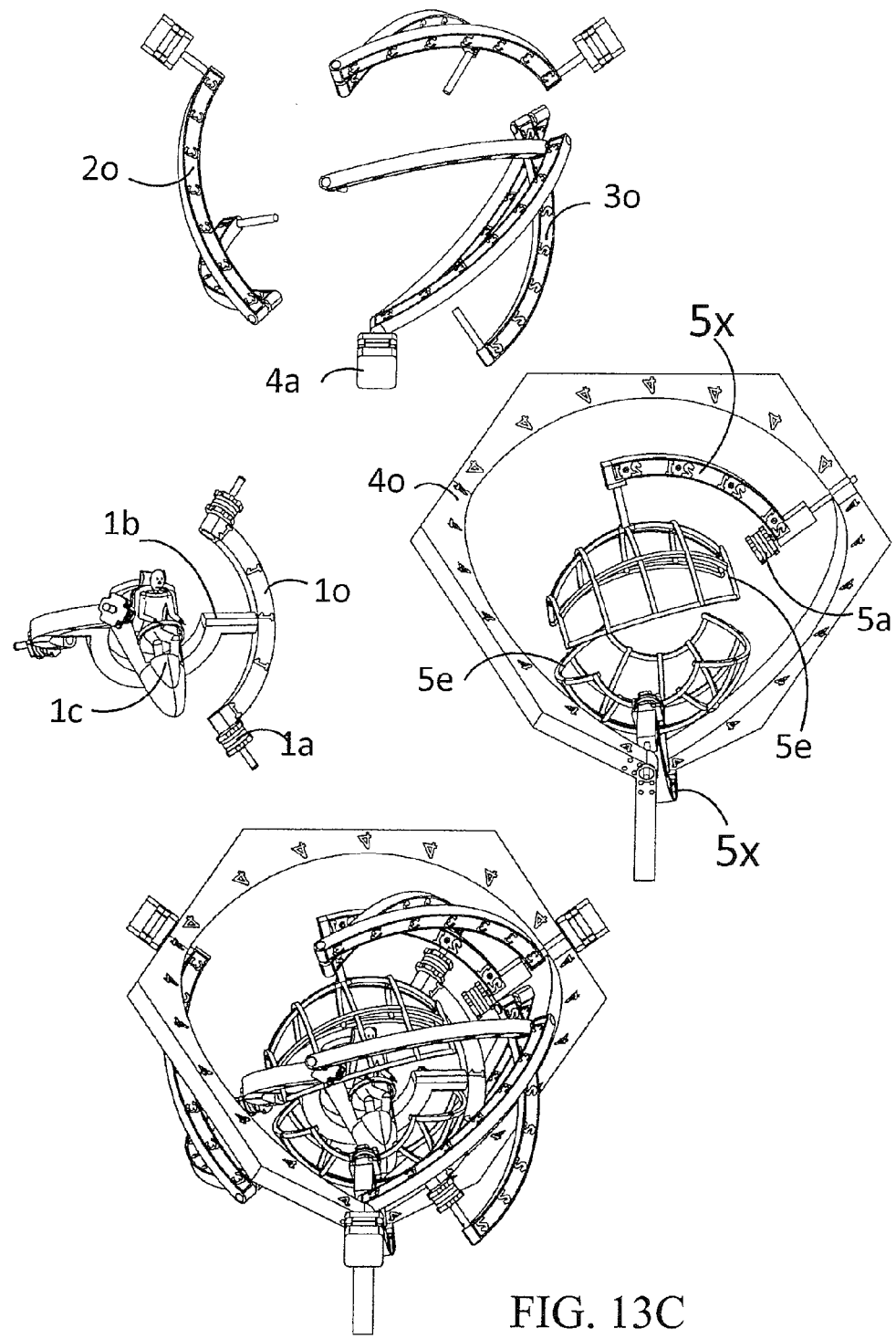
FIG. 13C is a side exploded view of FIG. 13A.

Referring to FIGS. 13A to 13C, a fifth embodiment, namely: double outer frame pivotal configuration with yoke type inner frame is shown. This embodiment is directed to two effector arc-links 5x pivotally connected to the outer frame 4o with yoke type inner frame 1o. The geometric orbit definition is $r_t < r_x < r_2$. The yoke type inner frame 1o is open-loop design. The open-loop design of the yoke type outer frame 4o can prevent the invention from being interfered by the end effectors 5e. The two end effectors 5e are opposite in the outer frame 4o. The end effectors 5e can be provided with a half-spherical holder having a projection screen or TV wall provided thereon. The inner carrier 1c on the inner support 1b can be mounted with a simulation cockpit for fighter pilots training or a steering wheel for an indoor game console.

Figure 14A:
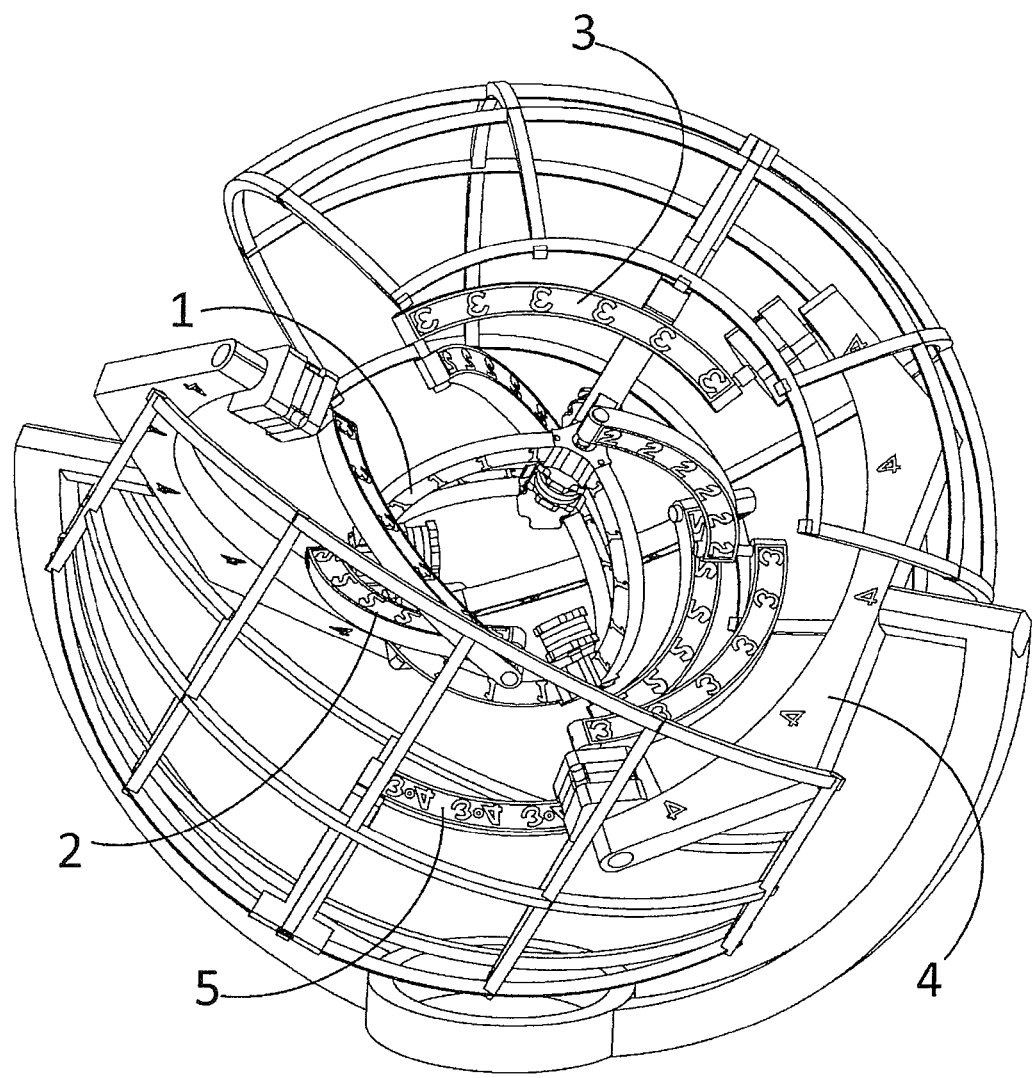
FIG. 14A is a perspective view of a sixth preferred embodiment showing double inner frame pivotal configuration with yoke type outer frame.
Figure 14B:
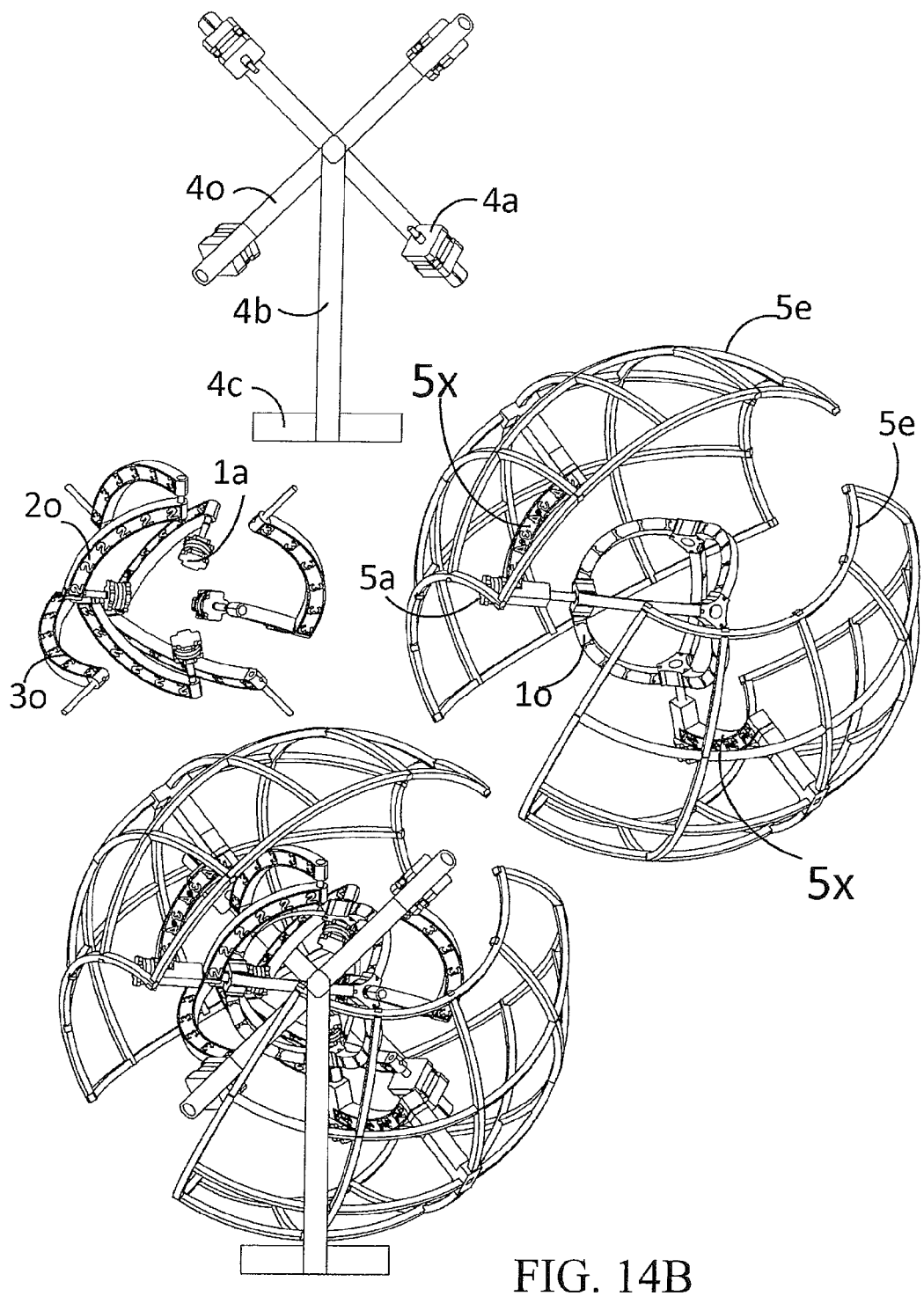
FIG. 14B is a front exploded view of FIG. 14A.
Figure 14C:
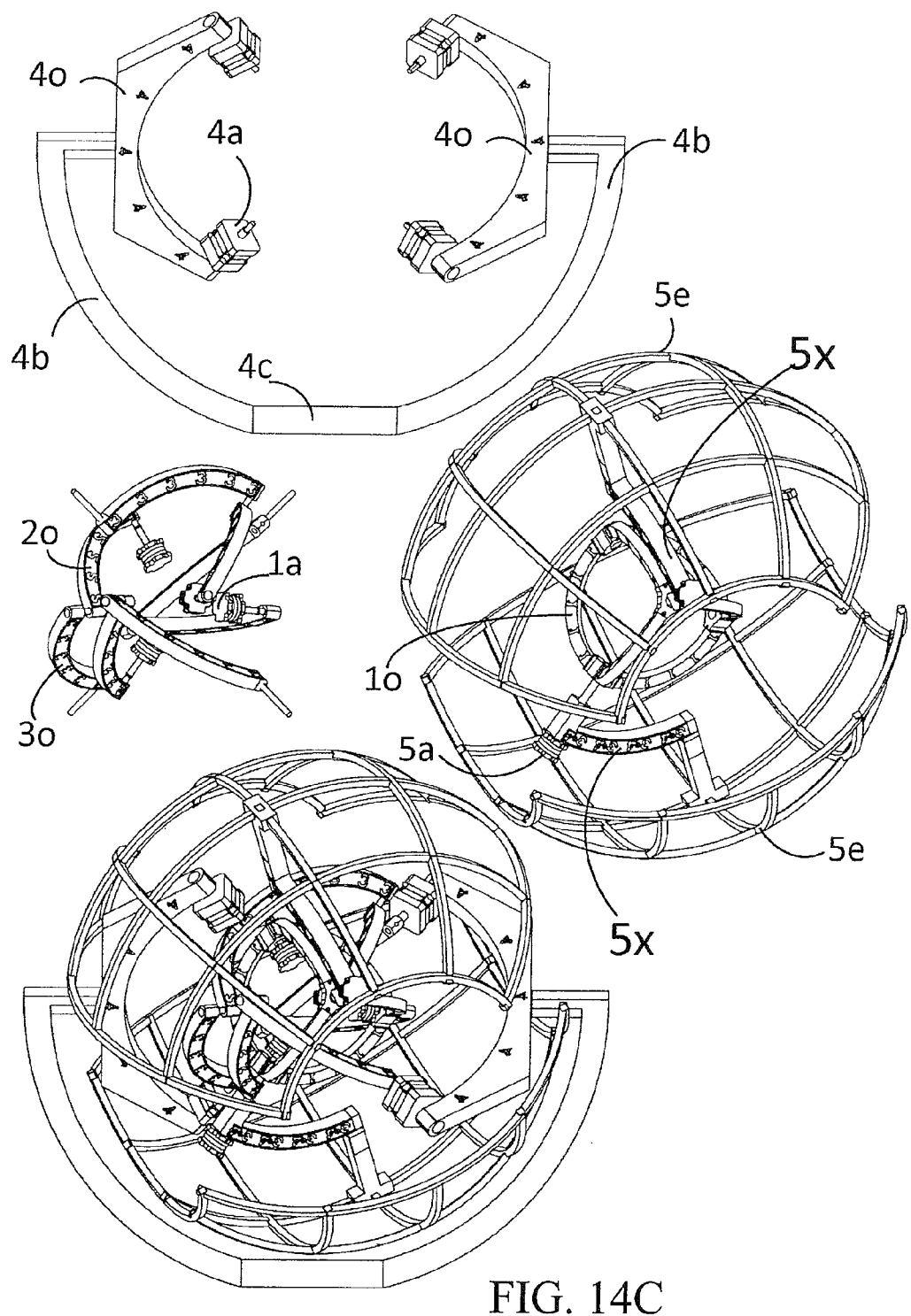
FIG. 14C is a side exploded view of FIG. 14A.

Referring to FIGS. 14A to 14C, a sixth embodiment, namely: double inner frame pivotal configuration with yoke type outer frame is shown. This embodiment is directed to two effector arc-links 5x pivotally connected to the inner frame 1o with yoke type outer frame 4o. The geometric orbit definition is $r_3 < r_x < r_4$. The yoke type outer frame 4o is open-loop design. The open-loop design of the yoke type outer frame 4o can prevent the invention from being interfered by the end effectors 5e. The two end effectors 5e are opposite in the inner frame 1o. The end effectors 5e can be provided with a half-spherical umbrella-shaped holder with a multi-passenger chamber or a large telescope provided thereon. The outer carrier 4c on the outer support 4b can be mounted with a cabin for amusement ride or a large telescope supporting base.

Figures 15A, 15B:
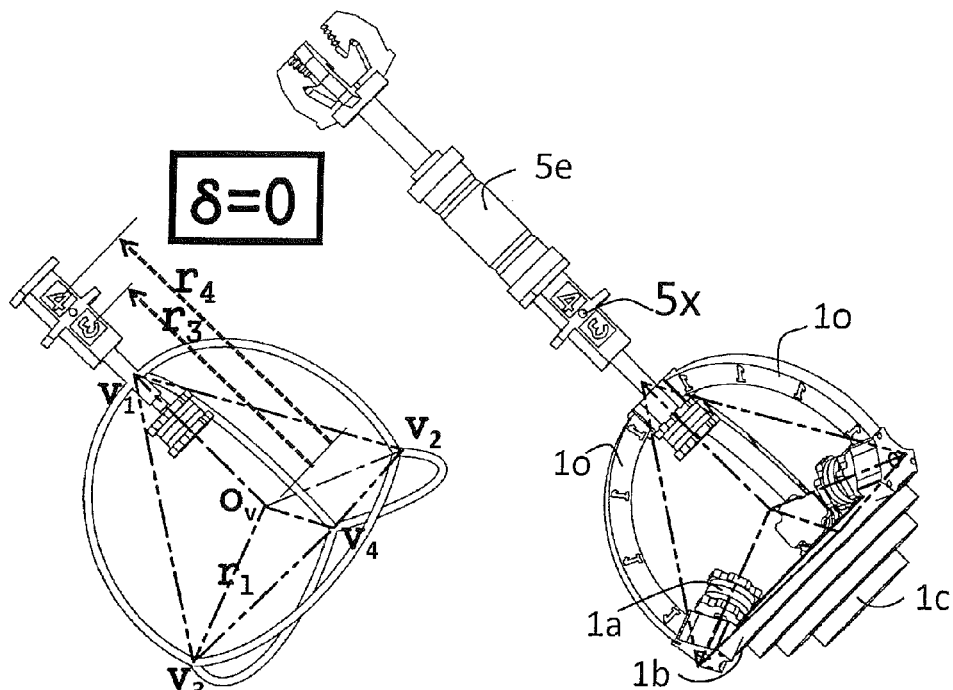
FIG. 15A is a perspective view of inner frame pivotal configuration with zero degree effector arc-link.
FIG. 15B shows a geometric definition of FIG. 15A.
Figures 15C, 15D:
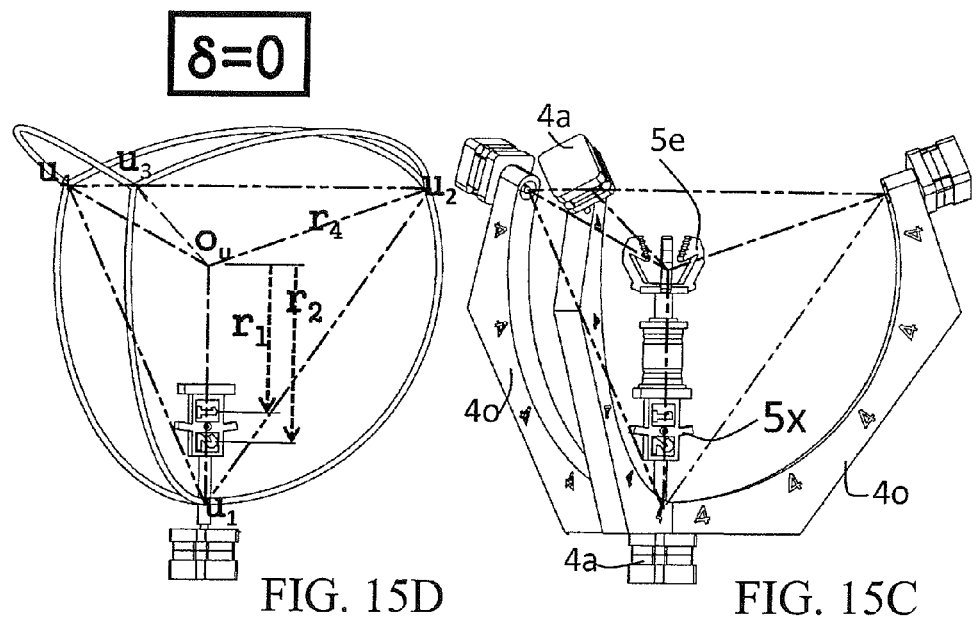
FIG. 15C i is a perspective view of outer frame pivotal configuration with zero degree effector arc-link.
FIG. 15D shows a geometric definition of FIG. 15C.

Three embodiments belong to outer configuration are separately demonstrated by FIG. 1, FIG. 11, FIG. 13. The other three embodiments belong to inner configuration are separately demonstrated by FIG. 10, FIG. 12, FIG. 14. For easier understanding geometrical definition and hierarchy relation and connecting method between each mechanical parts, a generic embodiment is specifically disassembled into elements level. These elements are detail and all-aspect demonstrated by FIG 2~FIG 9. The significant improving element under specific geometrical constraint is particularly demonstrated by FIG. 15. Follow the same definition of species according to the office communication, each embodiment is corresponding to its specific assembly drawing. The ac length of the effector arc-link 5x is less than or equal to 90° and is denoted by δ, that is δ≤90°. But arc length of the effector arc-link 5x being zero degree is still within the scope of the embodiment, that is δ=0°. It is similar to a folding fan when its spreading ribs fold together to form a single radial one. In this specific case, the effector arc-link whose two ends are aligned is folded as a radial link and thus there is no need of installing the effector rotating member 5a. The inner frame or outer frame 4o pivotally connected to the radial effector arc-link 5x can be designed as open-loop structure because deformation caused by the effector arc-link 5x is decreased. FIG. 15A shows a specific case of the inner frame pivotal configuration wherein the radial effector arc-link 5x is pivotally connected to the inner frame 1o and pivots with the inbound end of an inner arc-link 2o. The end effector 5e is radial outbound mounted on the radial effector arc-link 5x (see FIG. 15B). FIG. 15C shows a specific case of the outer frame pivotal configuration wherein the radial effector arc-link 5x is pivotally connected to the outer frame 4o and pivots with the outbound end of an outer arc-link 3o. The end effector 5e is radial inbound mounted on the radial effector arc-link 5x (see FIG. 15D).

The invention is described in terms of six embodiments. For their geometrical and symmetrical character are classified as outer and inner configuration. Therefore, these embodiments can be classified as two groups of claims, claim 1~claim 5 are grouped for outer configuration, claim 6~claim 10 are grouped for inner configuration.

What is claimed is:

1. A spherical coordinates manipulating mechanism comprising an outer frame assembly, an inner frame assembly, four outer arc-link sets each including an outer arc-link, four inner arc-link sets each including an inner arc-link, and at least one effector arc-link set, wherein:

the outer frame assembly comprises an outer frame including a plurality of brackets and four outer rotating members mounted to the outer frame wherein the outer frame has four vertexes geometrically defined by an outer tetrahedron, vertex-to-center lines of the outer tetrahedron are coincided with a center of the outer frame, and an axis of the outer rotating member is coincided with a vertex-to-center line of the outer tetrahedron;

the inner frame assembly comprises an inner frame including a plurality of brackets and four inner rotating members mounted to the inner frame wherein the inner frame has four vertexes geometrically defined by an inner tetrahedron, vertex-to-center lines of the inner tetrahedron are coincided with a center of the inner frame, the center of the inner frame is coincided with the center of the outer frame, and an axis of the inner rotating member is coincided with a vertex-to-center line of the inner tetrahedron;

the outer arc-link has an outbound end pivotally connected to one of the outer rotating members through an outer axle, and an inbound end pivoted with an outbound end of the inner arc-link through a middle axle wherein both the outer axle and the middle axle are coincided with the center of the outer frame;

the inner arc-link has an inbound end pivotally connected to one of the inner rotating members through an inner axle wherein the inner axle is coincided with the center of the inner frame;

sum of arc lengths of any two of the outer arc-links is greater than or equal to an angle between their corresponding vertex-to-center lines of the outer frame;

sum of arc lengths of any two of the inner arc-links is greater than or equal to an angle between their corresponding vertex-to-center lines of the inner frame;

characterized in that each of the at least one effector arc-link set (5) comprises an effector arc-link and an effector rotating member and an end effector; wherein the effector arc-link is pivotally connected to the outer frame and pivots with outbound end of an outer arc-link, and an axis of outbound end of the effector arc-link is coincided with a vertex-to-center line of the outer tetrahedron for concentrically rotating around an orbit between inner frame and each inner arc-links; wherein the end effector is radially disposed on inboard of inbound end of the effector arc-link; wherein the effector rotating member is pivotally connected on outboard of inbound end of the effector arc-link and radially pivots with the end effector; and arc length of the effector arc-link is less than or equal to 90°.

2. The spherical coordinates manipulating mechanism of claim 1, wherein the outer frame assembly further comprises an outer support disposed on the outer frame, and an outer carrier disposed on the outer support, and wherein the inner frame assembly further comprises an inner support disposed on the inner frame, and an inner carrier disposed on the inner support.

3. The spherical coordinates manipulating mechanism of claim 1, wherein the outer frame is a closed-loop structure, and the inner frame is an open-loop structure.

4. The spherical coordinates manipulating mechanism of claim 1, wherein the inner rotating member is a torque output device, an angle sensor, or a bearing; the outer rotating member is a torque output device, an angle sensor, or a bearing; the effector rotating member is a torque output device or a device for fastening rotational member; and for each arc-link serial set, at least one of the outer rotating member and the inner rotating member connected thereto is a torque output device.

5. The spherical coordinates manipulating mechanism of claim 1, wherein arc length of the effector arc-link is zero degree, the two ends aligned effector arc-link is folded into a radial link, the radial effector arc-link pivotally connected to the outer frame and pivots with the outbound end of an outer arc-link, wherein the end effector is radial inbound mounted on the radial effector arc-link.

* * * * *